United States Patent [19]

Kalthoff et al.

[11] 3,726,400

[45] Apr. 10, 1973

[54] DOCUMENT RETRIEVAL APPARATUS AND METHOD

[75] Inventors: Robert J. Kalthoff, Cincinnati; Richard C. O'Brien, Dayton, both of Ohio

[73] Assignee: O. K. Partnership, Cincinnati, Ohio

[22] Filed: Dec. 29, 1971

[21] Appl. No.: 213,848

[52] U.S. Cl.....................................209/80.5, 209/75

[51] Int. Cl...............................................B07c 1/20

[58] Field of Search............................209/80.5, 110.5

[56] References Cited

UNITED STATES PATENTS

| | | | |
|---|---|---|---|
| 3,616,902 | 11/1971 | Parry | 209/80.5 |
| 3,586,186 | 6/1971 | Powers | 209/110.5 |
| 3,536,194 | 10/1970 | Novak | 209/80.5 |

*Primary Examiner*—Allen N. Knowles
*Attorney*—James S. Hight et al.

[57] ABSTRACT

A document retrieval apparatus and method having a plurality of movable trays each containing encoded documents which are normally stored in addressable crypts arranged in two opposed, spaced matrices with the crypt openings of respective matrices in common vertical planes, a main document selector designed to select a desired document from among a tray of encoded documents transported thereto, and a tray transport movable in the space between the crypt matrices, the main selector and the crypt openings for transferring trays of encoded documents between their respective crypts and the main selector, and a keyboard control console which in response to entry of data identifying a document in a specific tray effects the transfer of the tray from its respective crypt to the main selector whereat the desired document is then ejected by the selector from among those of the retrieved tray. A second, or buffer, selector, which is searched along with the main selector when a document is sought, is provided for temporarily storing retrieved documents prior to their return to storage, or new documents prior to infiling, in the movable trays stored in the crypts.

8 Claims, 33 Drawing Figures

PATENTED APR 10 1973

3,726,400

SHEET 06 OF 15

DOCUMENT RETRIEVAL APPARATUS AND METHOD

This invention relates to mechanized document retrieval, and more particularly to mechanized document retrieval apparatus and methods wherein groups of documents normally stored remote from a document selector are, on command, transported to the selector where the transported documents are searched to locate a desired card which is then available for reference, further processing, or the like.

The document retrieval apparatus and methods of this invention, while of general utility in many respects, are of particular value in connection with automatic document selection of the type disclosed and claimed in the patent of Robert D. Parry, U.S. Pat. No. 3,478,877 entitled "Article Selection System". As disclosed in greater detail in that patent, the documents are edge coded with identifying information by removing, e.g., notching, selected teeth from a bottom horizontal edge termed the "sorting edge". Thereafter, a large number of documents, e.g., 2,000, are stored in a deck located in a card selector, with the sorting edges of the documents collectively forming the lower surface of the deck. Ferromagnetic implants, which are provided in each document, are disposed along another edge of the document,namely, a vertical edge, designated the "front edge".

In order to select a desired document or documents from the deck located in the selector, an operator actuates a series of keys to set up the desired code on a series of vertically shiftable sort bars located in the selector in a horizontal plane transverse to the sorting edges of all documents. Certain of the sort bars enter the spaces between adjacent teeth in the lower edges of the document, the particular sort bars depending on the code of the desired document. A horizontal magnet common to all documents and movable in a direction parallel to the sorting edges is adapted to be brought into engagement with the ferromagnetic implants of the documents which are aligned with respect to each other. After selected ones of the sort bars have been raised into the interstitial spaces of the document sorting edges, the magnet is moved away from the deck to partially withdraw all documents not restrained by the sort bars, that is, all documents having a removed tooth pattern corresponding to the code of the desired documents. Thereafter, all the documents not initially moved are held in place by a locking bar, also transverse to, and common to, all documents, which is raised into engagement with locking notches provided in the documents, while the selected and conformingly notched documents are further separated by additional outward movement of the magnet.

To maximize the utility of a single selector system, which as noted is effective to simultaneously search all documents in the single deck stored in the selector, in certain applications it is desirable to associate with the single selector a large number of individual decks of documents, any one of which, while normally stored remote from the selector, can be brought to the selector for a search operation. In such cases, the decks of documents which in one form may be cards are stored in individual containers or trays, the trays in turn normally being stored remote from the selector in a bank of addressable locations or crypts. A tray retriever movable between the selector and the various tray crypts of the bank is provided to transport, upon command, a tray containing a desired card to the selector whereat the desired card is selected from the deck contained in the retrieved tray.

In accordance with one aspect of this invention the crypts are arranged in at least one matrix of forward and rear vertical stacks with the crypt openings of both stacks in a common vertical plane. Located adjacent the crypt openings is a movable tray support for transporting a desired tray between storage in its respective crypt and a position at the selector with the lowermost sorting edges of the cards exposed through the open bottom of the tray in operative relation to the sort and lock bars of the card selector which are in a horizontal plane perpendicular to the plane of the crypt openings. The movable tray support, in a preferred form, includes a vertical tower on which an elevator is mounted for up and down sliding movement. The elevator has a hook for engaging a tray when the elevator is aligned with its crypt and transferring the tray between the crypt and elevator. The vertical tower is mounted on a platform which is movable between forward and rear positions in which the tray hook of the elevator is aligned with the trays of the forward and rear crypt stacks, respectively. In accordance with this arrangement, the selector is located such that when the tower is in its forward position, the elevator is aligned above the selector to permit a tray supported thereby to be deposited atop the selector as the elevator descends on the tower.

It is essential that the notched sorting edges of the cards of a tray positioned in the selector be properly aligned with the sort and lock bars thereof which, as noted, are disposed in a horizontal plane perpendicular to the plane of the crypt opening. A unique approach has been incorporated in this invention which permits proper card sorting edge and selector bar alignment and yet does so without requiring critical positioning of the tray in the selector by the tray retriever.

Specifically, and to avoid criticality of retriever positioning in a horizontal direction perpendicular to the plane of the crypt openings, the length of the selector sort and lock bars is designed to exceed the length of the tray which is deposited in the selector by the retriever. In this way, and to the extent of the excess in length, the tray retriever can position the tray without criticality anywhere in a horizontal direction perpendicular to the crypt opening plane, nd the sort and lock bars will be in operative relationship to the sort edges of all cards in the deposited tray.

To reduce the criticality in retriever positioning in the horizontal direction parallel to the plane of the crypt openings, the selector is provided with fixed locating means which the rear wall of a deposited tray can be urged against to properly position the tray (and the cards therein) relative to the selector sort and lock bars when the elongated selector magnet is moved inwardly prior to a selection cycle and abuts the front vertical card edges, moving the tray against the selector location means and the card notches into registration with the selector bars. Thus, the tray and contained cards are moved horizontally against the locator by the inwardly moving selector magnet in a direction parallel to the crypt opening plane to produce the desired condition of alignment between the notches of the sorting edges of the deposited cards and the selector sort and lock bars.

Finally, to reduce the criticality in retriever positioning in a vertical direction, the tray supporting means on the elevator are designed to permit the elevator to overtravel in a downward direction as a tray supported thereby is deposited in the selector. In this way, the selector properly positions the tray and, hence, the coded edges of the documents contained therein, relative to the selector sort and lock bars regardless of the exact vertical position of the elevator. Of course, this assumes the elevator does overtravel at least to some degree. Thus, by virtue of the excessive lock and sort bar length, the selector locating member and inwardly moving magnet, and downward elevator overtravel, the movements of the tray retriever, including that of the tower, elevator and hook, in the course of depositing a retriever tray in the selector are not critical and hence need not be controlled to a high degree of precision. This reduction in retriever positioning criticality increases reliability and decreases system cost.

In accordance with another aspect of this invention, also designed to simplify the structure and operation of the tray retriever, the vertical tower which moves between forward and rear positions is secured to a horizontal platform mounted by a parallel linkage mechanism for pendulum-like movement between forward and rear positions. As a consequence of the pendulum mount, very little energy is required to transfer the tower between its forward and rear positions, the only energy being that required to overcome frictional losses incurred as the pendulum support swings through its arc between forward and rear positions.

For the purpose of automatically locating cards which may from time to time become misfiled in the trays due to human operator error, a document detector strategically positioned in the selector, in combination with a unique card selection procedure, is utilized. Specifically, a light source and phototransducer positioned in the selector on opposite sides and toward the rear of a deposited tray are provided to sense the existence in the deposited tray of a card which has not been selected, i.e., not been withdrawn from the tray, pursuant to a selection cycle. When a tray is retrieved and deposited in the selector, and the selector caused to go through a selection cycle to select all cards bearing encoded identifying data corresponding to the address of that tray, a misfiled card will not be selected, but rather will remain fully inserted in the deck. As such, the misfiled card will be detected by the combined phototransducer/light source detector, and an appropriate indication, such as a flashing light or the like, provided to the operator who can then manually remove the misfiled card for proper filing.

In accordance with another and very important aspect of this invention, a second or buffer selector is provided which is searched in parallel with the searching of the main selector, i.e., the selector to which the tray retriever transports trays. The buffer selector temporarily stores documents prior to filing of such in their respective trays at periodic intervals of extended duration, e.g., once per week. For example, the buffer selector temporarily stores all new cards which at appropriate periodic weekly intervals are transferred to their respective trays in the bank. Additionally, the buffer selector temporarily stores cards awaiting further processing which have been selected by the main selector as an incident to a tray retrieval operation. Such further processing may include updating, duplicating, or the like. Often cards are retrieved from their respective trays by the main selector on a more or less continuous basis throughout the day for further processing such as duplication, updating, or the like, but the duplication or updating is actually to be performed only at one point in the day, for example, at the end of the day. In such case, the continuously retrieved cards, upon retrieval, are transferred from the main selector to the buffer selector.

Since the main selector and buffer selector are searched simultaneously as an incident to any tray retrieval and search operation, if a card in the buffer selector, previously retrieved for copying or the like at the end of the day, is desired for another purpose during the day, it will be retrieved on command notwithstanding that it is not in its respective tray due to awaiting copying, etc. at the end of the day. Of course, while the cards are being duplicated or updated, the cards are in neither the buffer selector nor their respective tray and, hence, are not available for searching. However, such unavailability is not a serious disadvantage, particularly when viewed in light of the fact that all cards in the system are available for searching during the major portion of the day notwithstanding that during the day many will have been retrieved from their respective trays and stored in the buffer selector to await further processing.

These and other advantages of the invention will become more apparent from a detailed description of a preferred embodiment thereof in which.

Figures 6B, 6C, 15A:
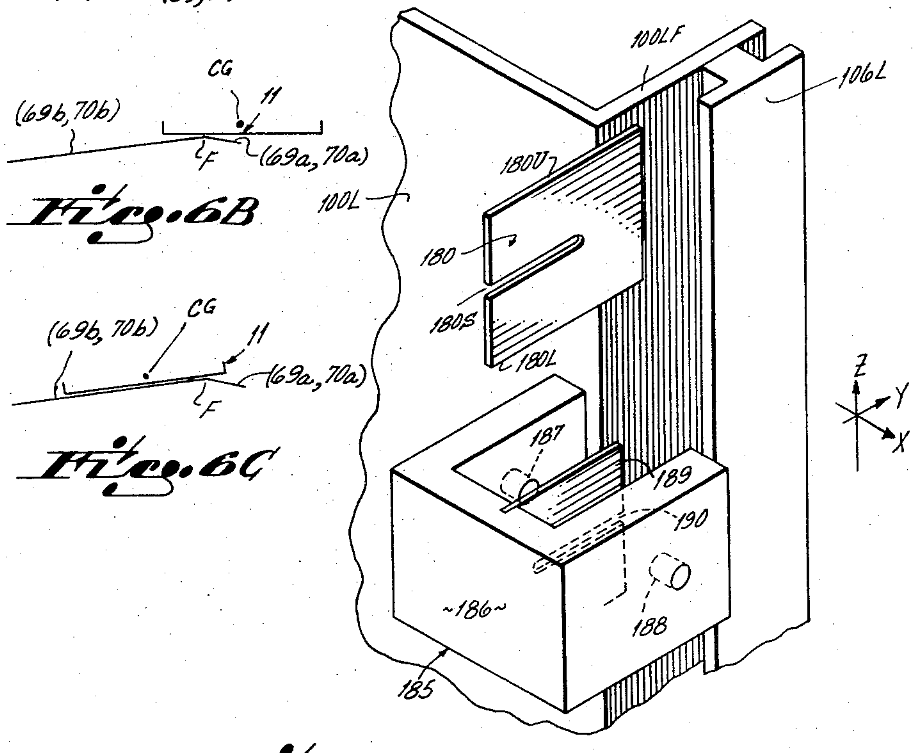
Figure 8:
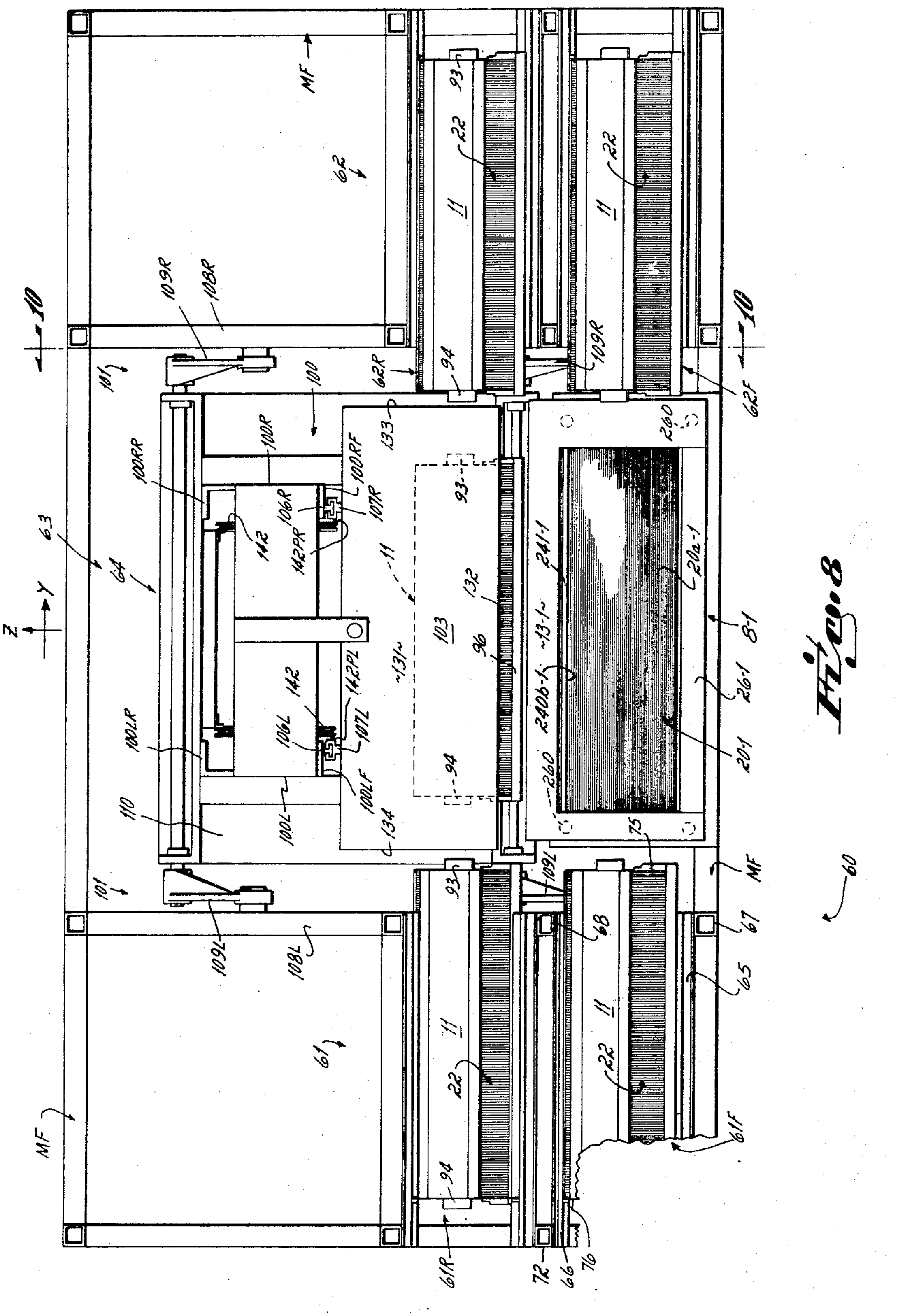
Figure 9:
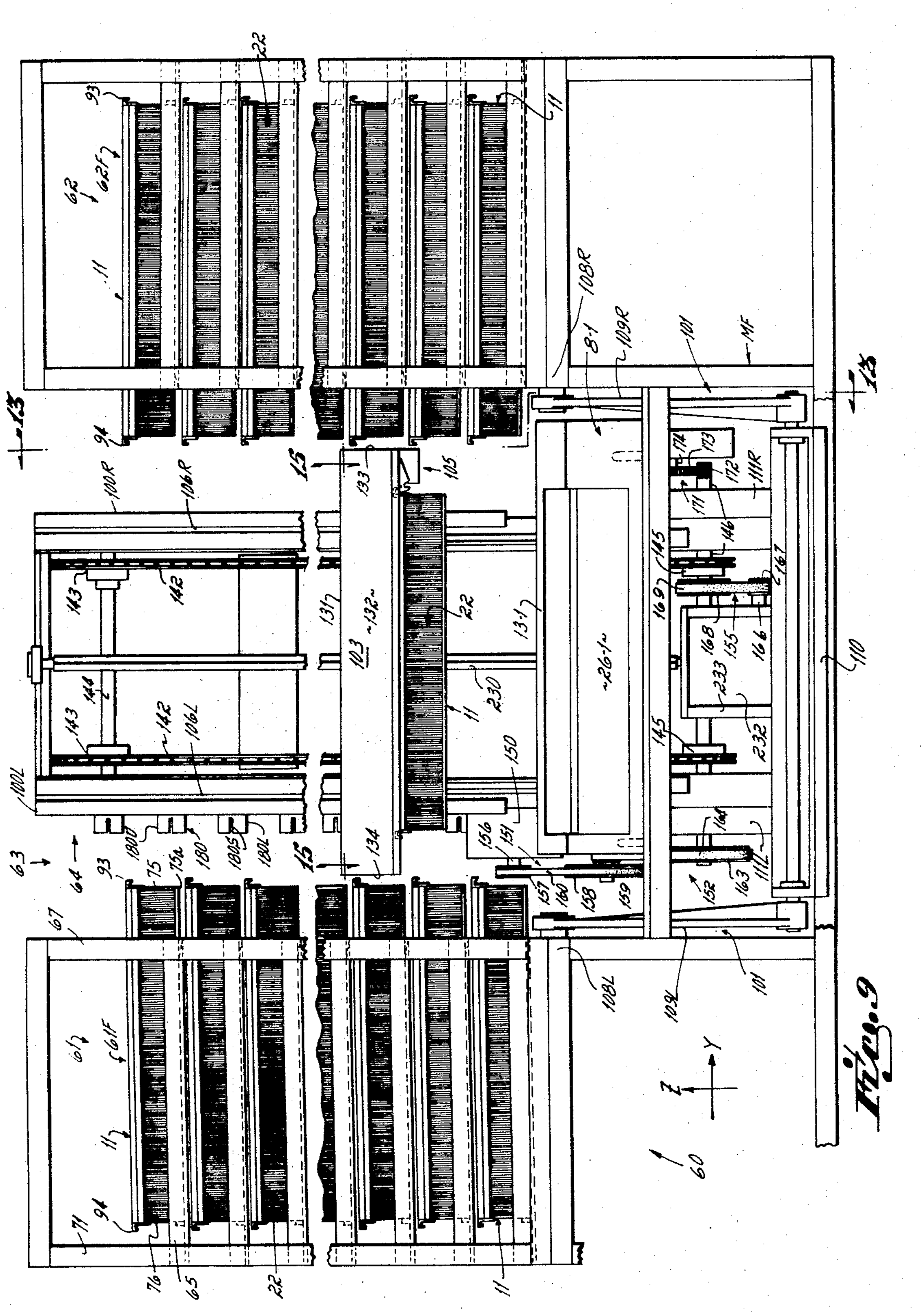
Figure 10:
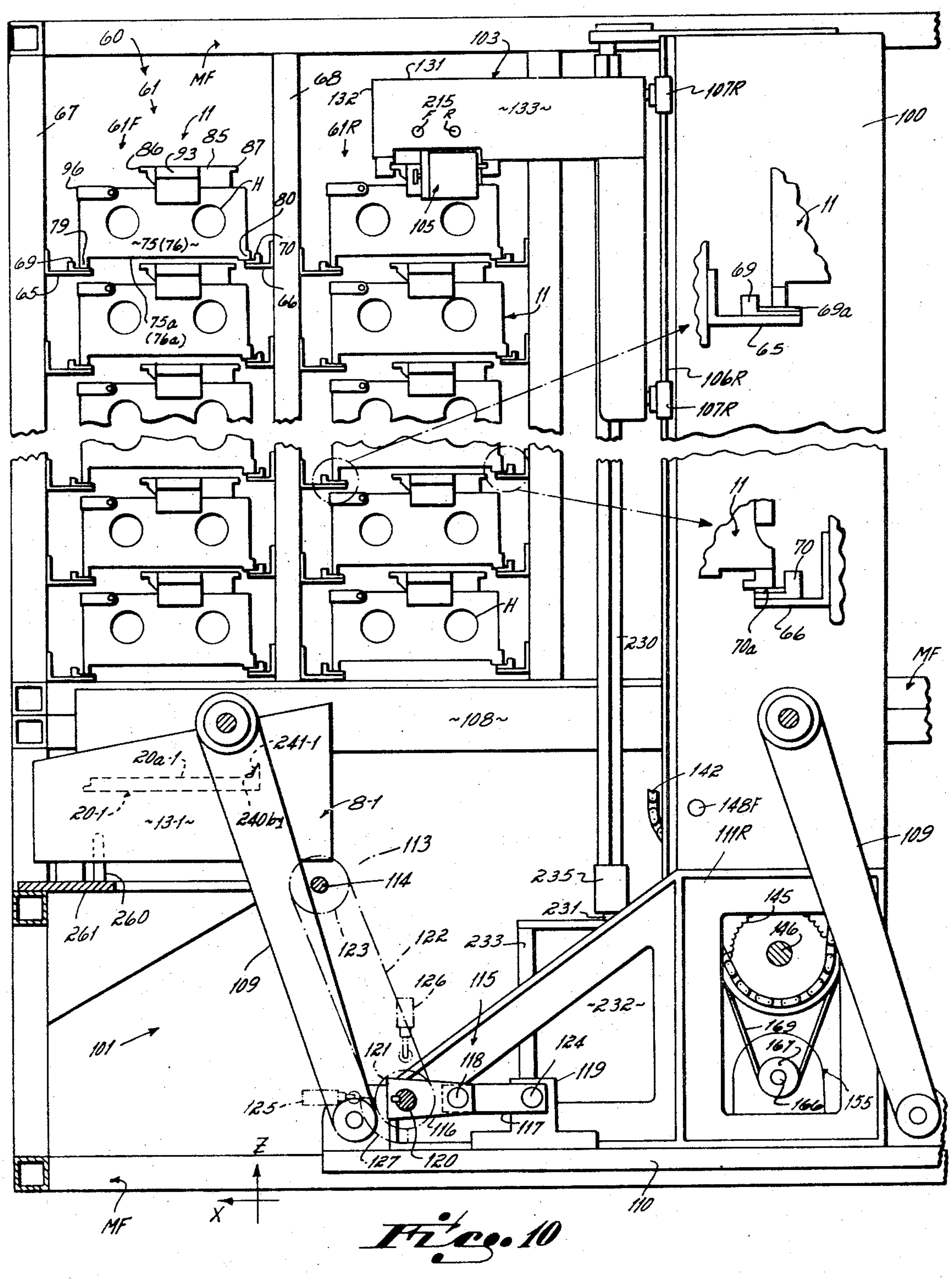
Figure 11:
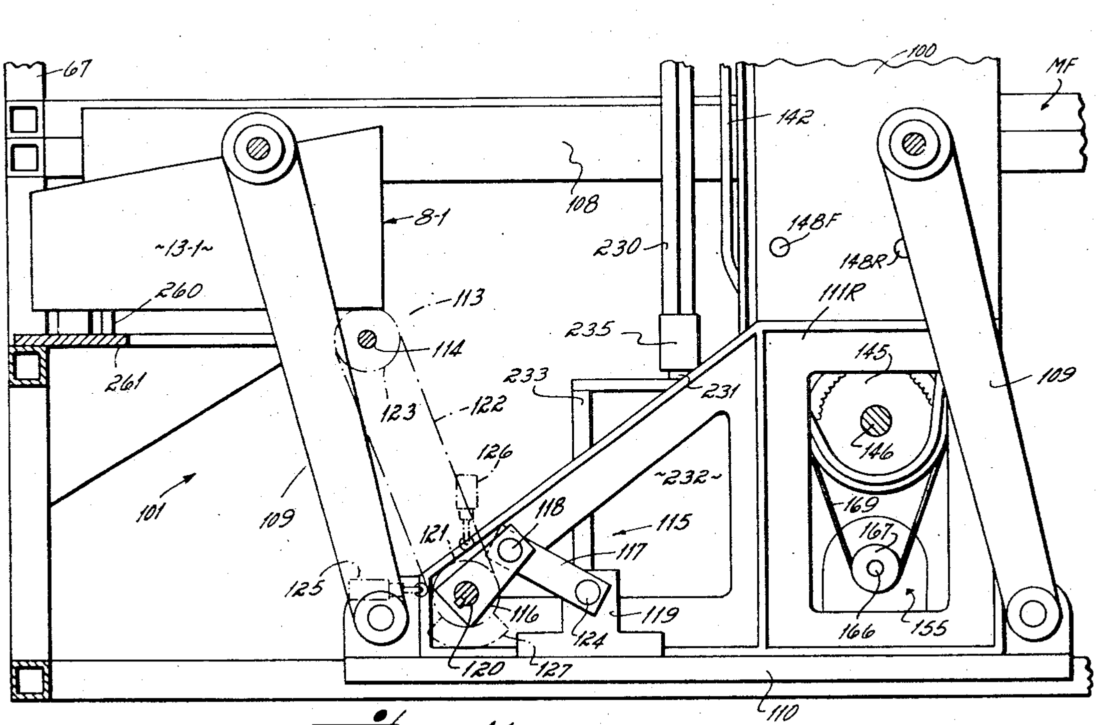
Figure 12:
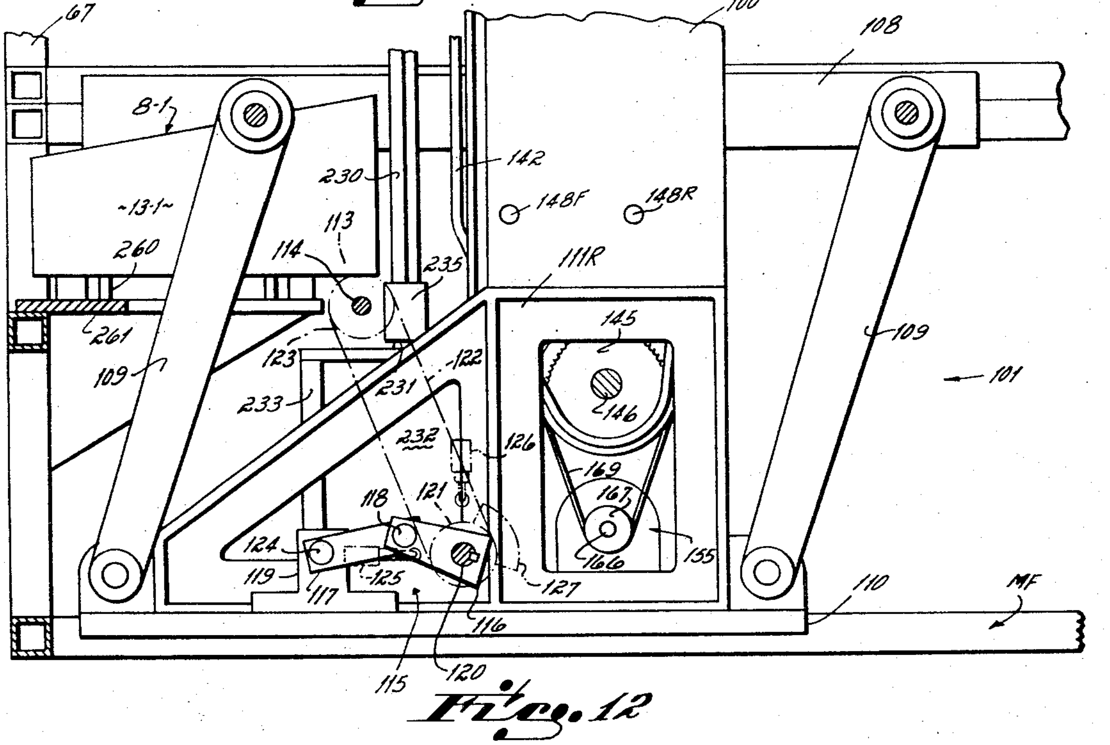
Figure 13:
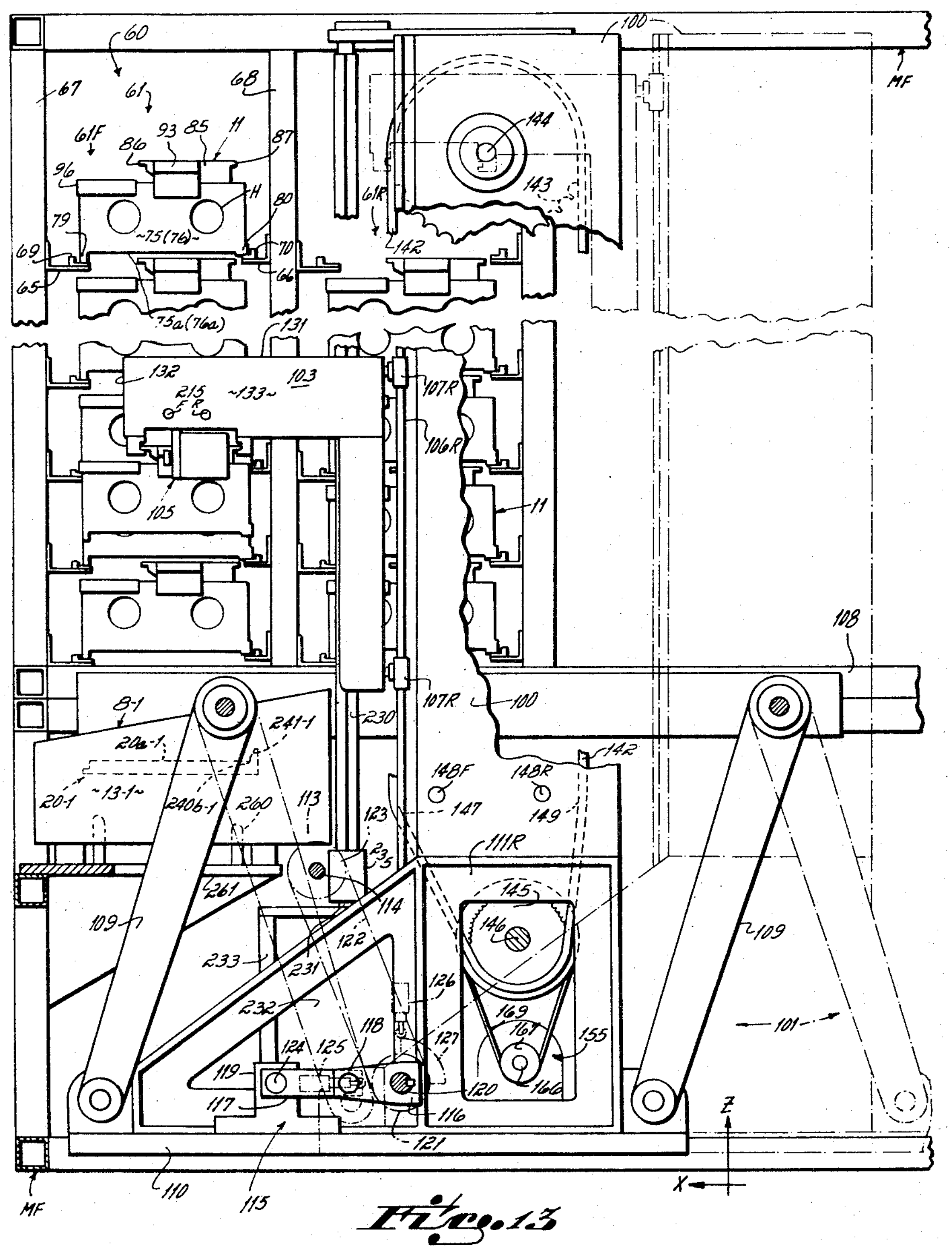
Figure 14:
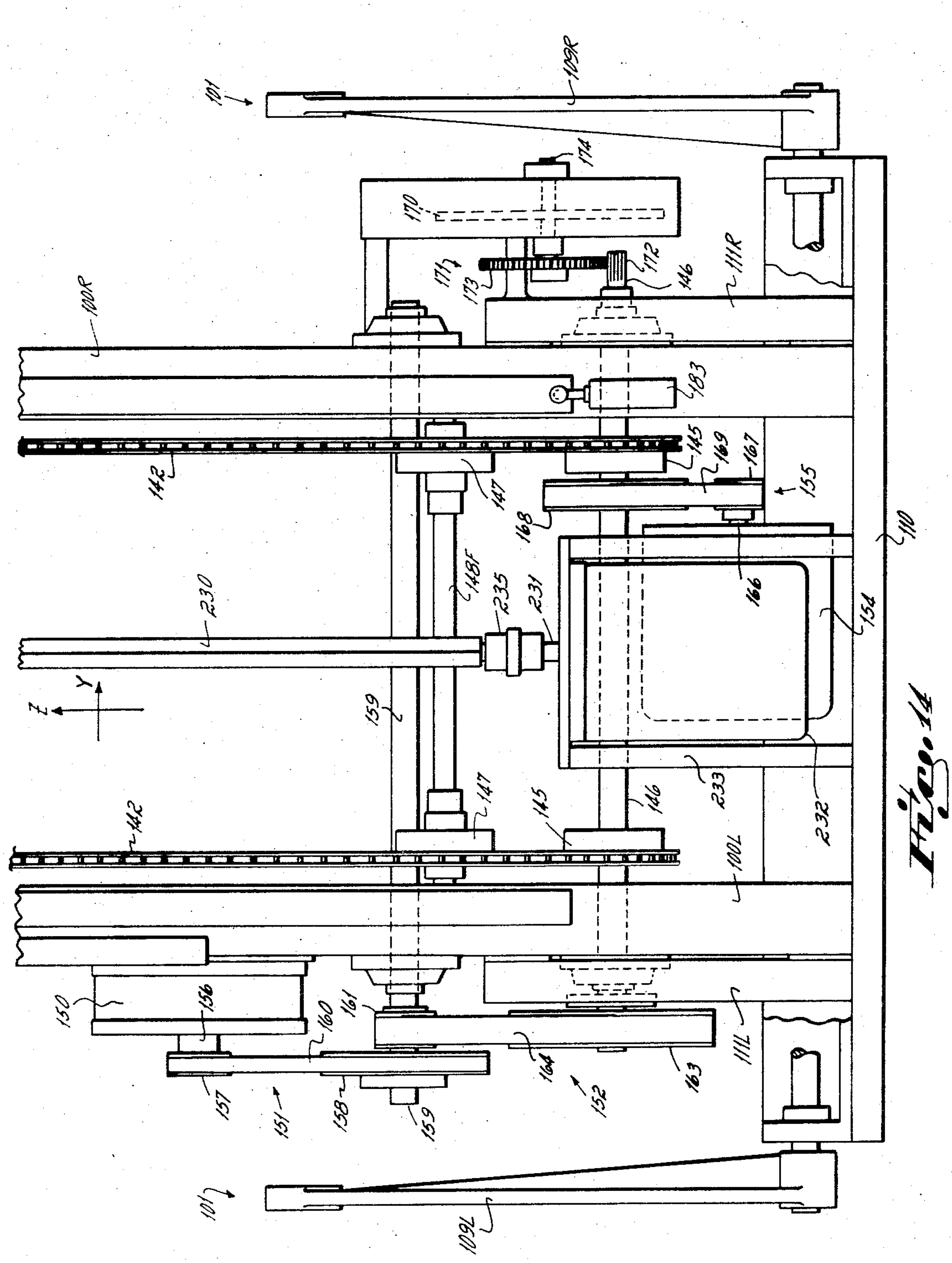
Figure 15:
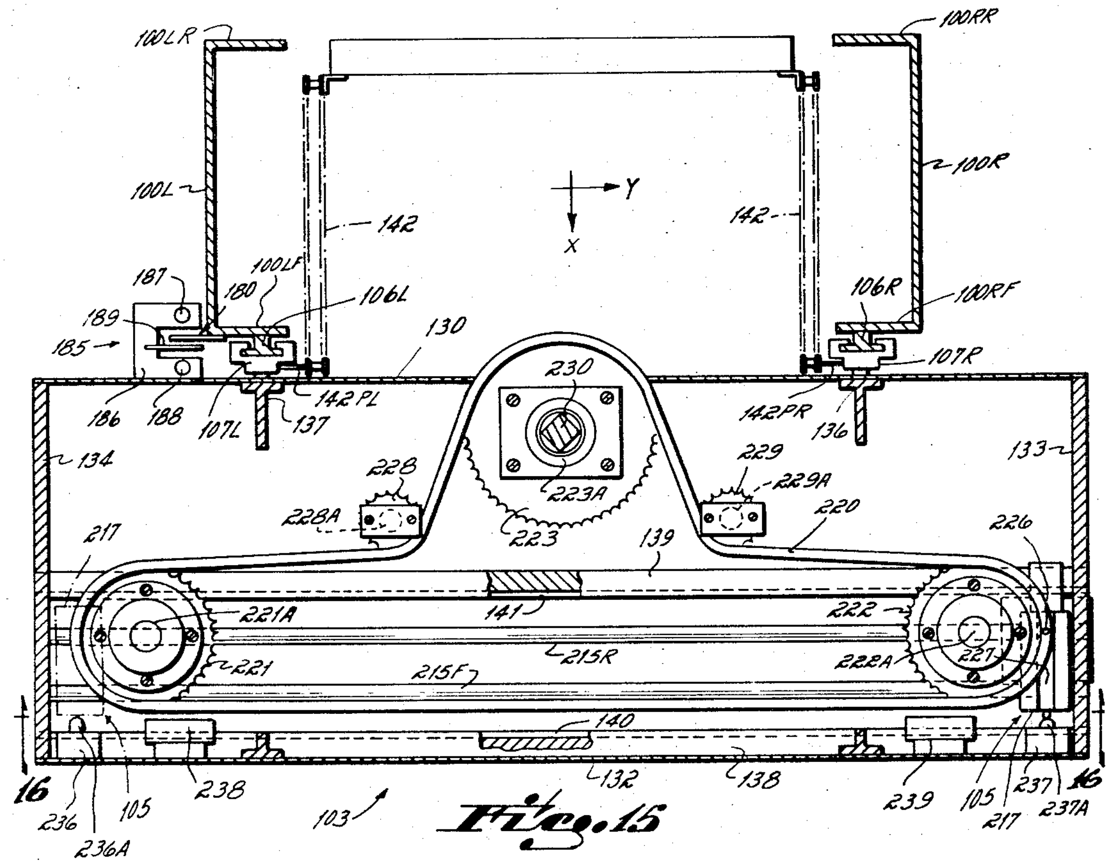
Figures 16, 16A:
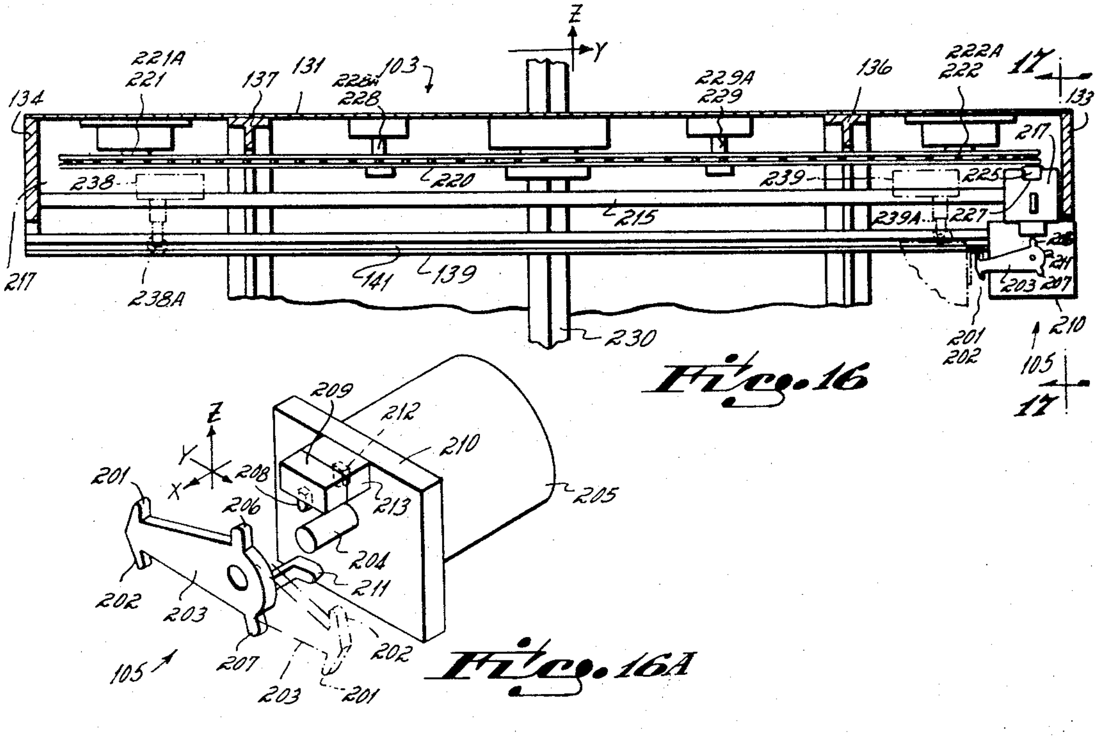
Figures 17, 18:
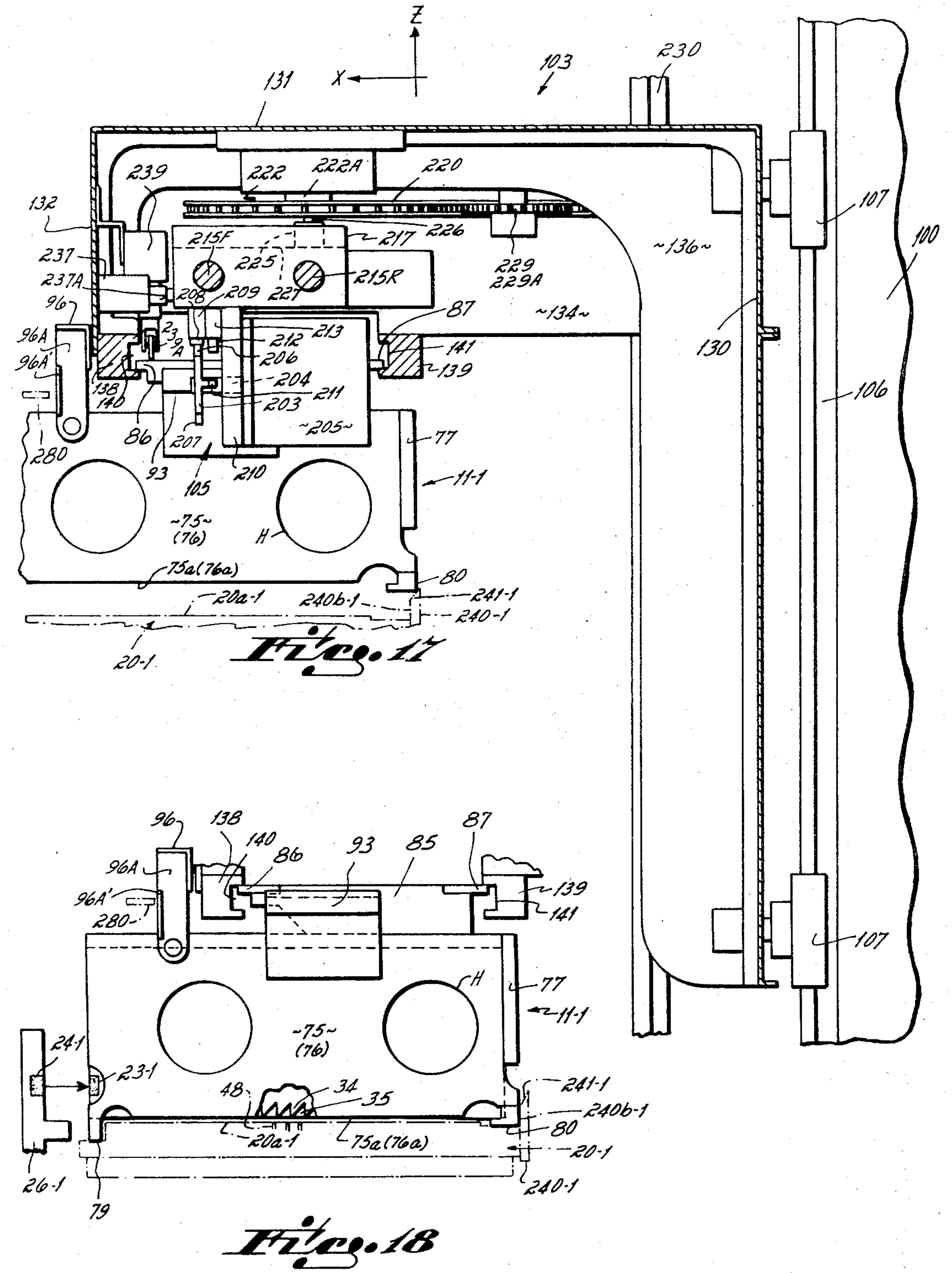
Figures 19, 20, 21:
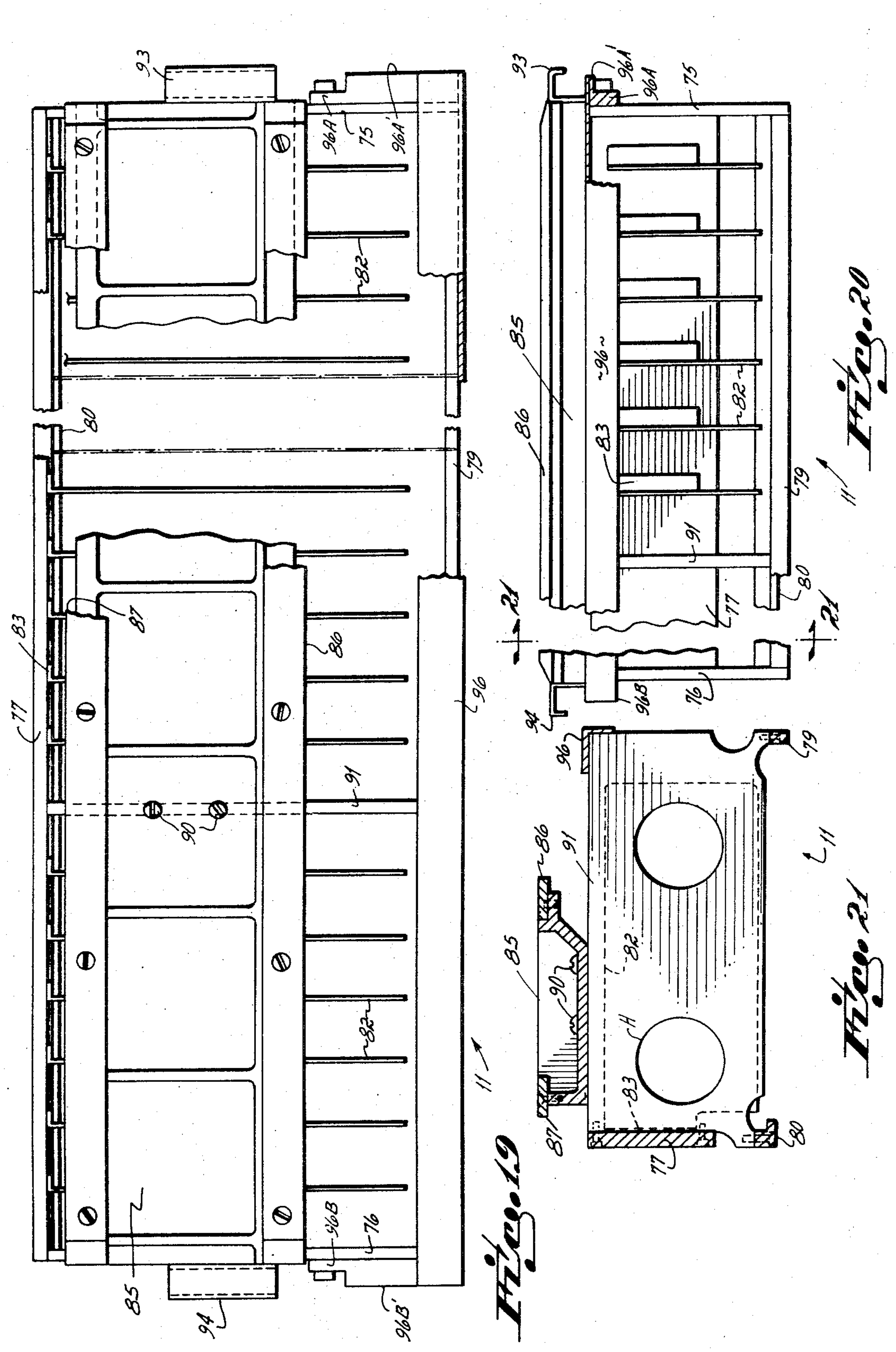
Figure 22:
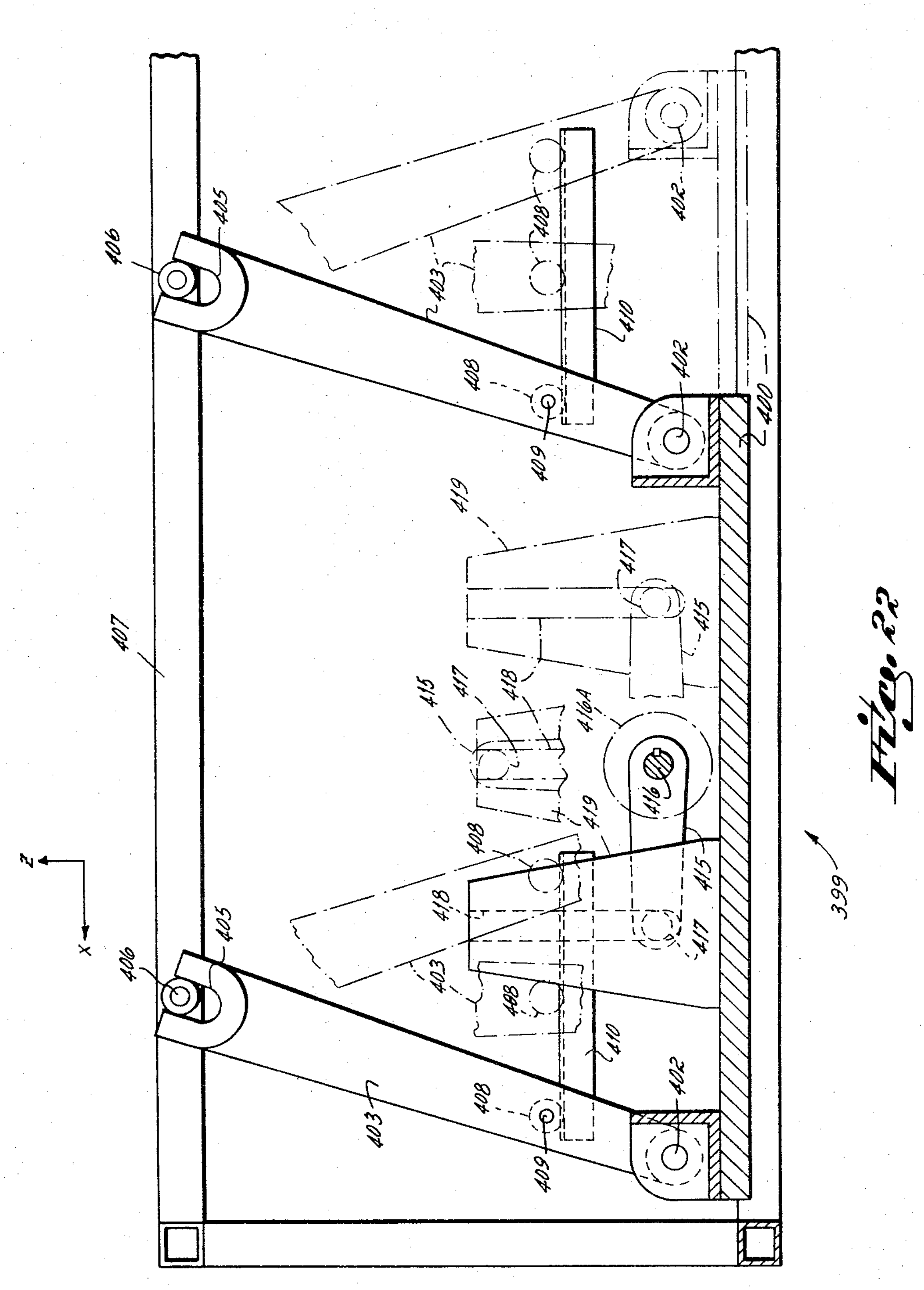

FIGS. 3, 4, 5, 6, and 7 are diagrammatic cross-sectional views showing the relationship of the elevator and tray hook, crypts, and trays in various stages of storage in their respective crypts, on the elevator, or in intermediate positions of transfer between crypt and elevator;

FIGS. 3A, 6A, 6B and 6C are diagrammatic cross-sectional views showing details of the crypt, tray and elevator;

FIG. 8 is a plan view of the tray bank, tray retriever, and main selector, showing a tray supported by the elevator;

FIG. 9 is a front elevational view of the crypt array, tray retriever, and main selector showing a tray supported by the elevator;

FIG. 10 is a cross-sectional view taken along lines 10—10 of FIG. 8;

FIGS. 11 and 12 are side elevational views showing the tower platform moving toward its rear and forward positions, respectively;

FIG. 13 is a cross-sectional view taken along lines 13—13 of FIG. 9;

FIG. 14 is a front elevational view of the lower portion of the tray retriever;

FIG. 15 is a cross-sectional view taken along lines 15—15 of FIG. 9;

FIG. 15A is a perspective view of the elevator, crypt level detector, and associated crypt level flag;

FIG. 16 is a cross-sectional view taken along lines 16—16 of FIG. 15;

FIG. 16A is a perspective view, partially exploded, of the tray hook and motor;

FIG. 17 is a cross-sectional view taken along lines 17—17 of FIG. 16;

FIG. 18 is an elevational view of a portion of the main selector showing a tray being deposited on the platen by the elevator;

FIG. 19 is a plan view, partially broken-away, of the tray;

FIG. 20 is a front elevational view, partially broken-away, of the tray;

FIG. 21 is a cross-sectional view of the tray taken along lines 21—21 of FIG. 20;

FIG. 22 is an elevational view of an alternative form of pendulum tower support;

FIGS. 23A–23E are schematic perspective views of a selector showing the relationship of the cards, platen, sort and lock bars, and movable magnet during different stages of a card selection cycle.

For the purpose of more easily understanding the retrieval method and apparatus of this invention, the invention is described in connection with card selection of the general type disclosed in Parry U.S. Pat. No. 3,478,877, the entire disclosure of which is specifically incorporated herein by reference. The Parry selector 8, as shown schematically in FIGS. 23A–23E, includes a housing 13, a stationary horizontally disposed planar platen 20 which supports a deck of randomly stored, vertically disposed cards 22, a transversely disposed elongated magnet 24 common to all the cards 22 and in alignment with ferromagnetic chips 23 implanted in the leading edges of the cards is secured to a drawer-like structure 26. The drawer 26 is mounted to housing 13 for sliding movement between an outer position (FIG. 23E) to which desired cards 22a are advanced from the deck by the magnet 24 in a manner to be described, and an inner position (FIGS. 23A, 23B) in which the magnet 24 is in contact with the ferromagnetic card implants 23 when the cards are stored in their normal position on the platen 20. Multiple card decks related respectively to different subject matter may, in conjunction with a single selector 8, comprise a card storage system. However, in such a multideck/single selector system, only a single deck of cards can be placed in the selector at any given time for card selection purposes, the other decks being stored remote from the selector.

As best seen in FIGS. 23A–23E, the cards 22 each have a toothed sorting edge 32, preferably the lower edge thereof, provided with alternate teeth 34-1 to 34-6 and registration notches 35-1 to 35-6. Each of the teeth 34-1 to 34-6 is susceptive of being encoded in binary by selective removal, as by notching, of the tooth. While only six teeth 34-1 to 34-6 have been shown along sorting edge 32, for the sake of convenience, in a typical installation the cards 22 are each provided with 60 encodable teeth which, when divided into 12 groups of five teeth each, can be utilized to encode 12 characters, for example, letters and/or numerals in a conventional two-out-of-five code format. Two of the characters can then be utilized to represent the address in binary-coded-decimal form of the particular deck 22 of a multi-deck storage system in which the card is typically stored, while the remaining ten characters can be utilized to further identify the card with respect to the other cards stored in that deck. The sorting edge 32 further includes a lock notch 36 located between the group of encodable teeth 34 and registration notches 35, and the transverse card edge 38 herein termed the "trailing edge". Adjacent to the lock notch 36 is a removed portion 40 of the card located intermediate the lock notch 36 and the trailing edge 38. The card 22 further includes the ferromagnetic chips 23 implanted in the card to the corner of the sorting edge 32 and a transverse edge 44 herein termed the "leading edge".

When the cards of a deck located in the selector 8 are in their normal unselected position on the selector platen 20, the registration notches 35-1 to 35-6 and the lock notch 36 are aligned with a plurality of transversely disposed sort bars 48-1 to 48-6 and the lock bar 50 which are disposed transverse to, and in common with, all the cards. Both the sorting bars 48-1 to 48-6 and the lock bar 50 are appropriately positioned in slots formed in the upper surface of the platen 20. The bars 48-1 to 48-6 and 50 are elevatable vertically from a reset position wherein their upper edges thereof are flush with the upper surface 20a of the platen 20, to a set position wherein the bars extend above platen surface 20a and enter their associated notches 35-1 to 35-6 and 36, respectively, of cards located in the storage position. Elevation of the bars 48-1 to 48-6 and 50 is effected by solenoids (not shown) controlled by a keyboard console (also not shown).

Assuming a deck of cards 22 is properly located on selector platen 20, to select a card or cards 22 having a particular code, for example, a card 22a from the deck having teeth 34-2 and 34-6 removed, from among a group of cards 22*b* in the deck not having teeth 34-2 and 34-6 removed, the appropriate sort bars 48 are elevated above the platen surface 20*a* to the set position. Specifically, sort bars 48-2 and 48-6 corresponding to the removed tooth pattern of the desired card 22*a* are elevated to the position shown in FIG. 23B. With the sort bars 48-2 and 48-6 in a set position, the desired cards 22a having teeth 34-2 and 34-6 removed can be laterally shifted in the direction 46a of arrow 46 a distance equal to the width of one tooth, to produce an initial separation of the desired cards 22*a* in the deck of cards 22 from the undesired cards 22*b*. However, the undesired cards 22*b* not having tooth 34-2 and/or tooth 34-6 removed are restrained from lateral movement in the direction 46*a* of arrow 46 by one or both of the set or elevated sort bars 48-2 and 48-6, which, in the set position, mechanically interfere with the unremoved teeth 34-2 and 34-6 of the undesired cards 22*b*.

Figure 23A:
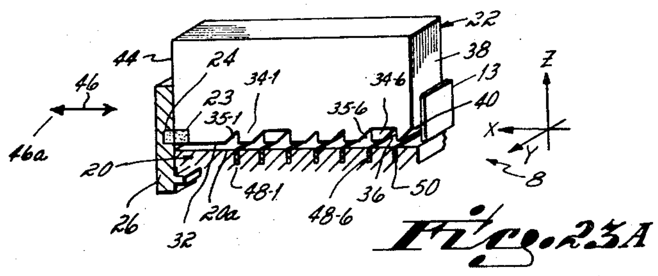
Figure 23B:
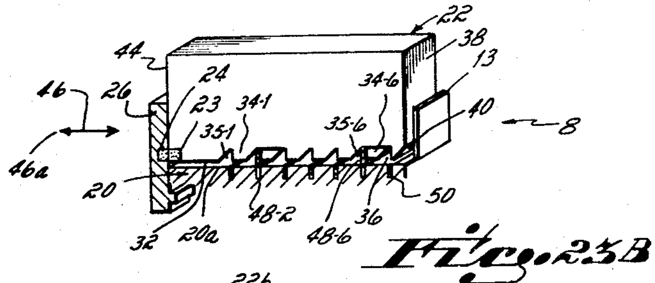
Figure 23C:
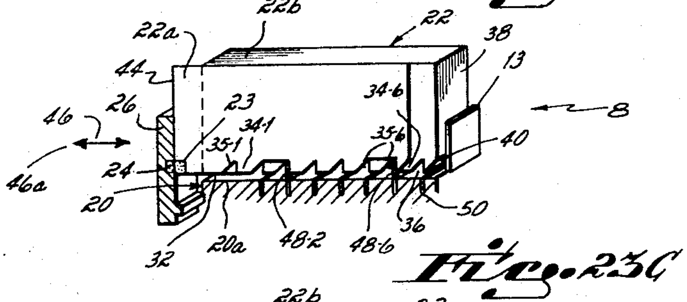

With the sort bars 48-2 and 48-6 conforming to the removed tooth pattern of the desired card 22*a* in the set position, the drawer-mounted magnet 24 is shifted in the direction 46a of arrow 46 a distance equal to the width of one tooth to the position shown in FIG. 23C. Those cards free to shift, namely, the desired cards 22a move with the magnet 24 a distance of one tooth width, effecting an initial separation of the desired and undesired cards. Movement of the desired cards 22*a* in this fashion aligns the removed portion 40 of the desired cards opposite the lock bar 50. The undesired cards 22*b* do not move in the direction 46*a* of arrow 46 by reason of the engagement of one or more of their unremoved teeth 34-2 and 34-6 with the set sort bars 48-2 and 48-6, respectively. Consequently, the lock notches 36 of the undesired cards **22*b* remain aligned with the lock bar 50**. At this point the initial phase of the card selection operation is complete.

Figure 23D:
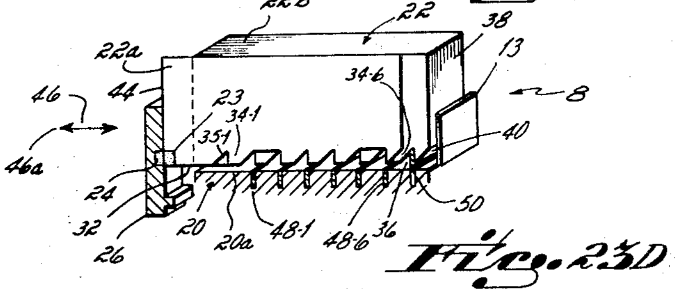
Figure 23E:
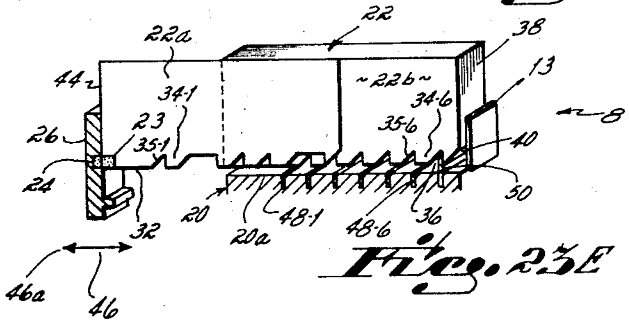

Further separation of the desired cards **22*a* from the undesired cards 22*b* of the deck 22 to effect the final card selection phase of the retrieval operation is accomplished by elevating to a set position the lock bar 50, and returning to an unset position the sort bars 48-2 and 48-6, as shown in FIG. 23D. Setting lock bar 50 positively prevents the undesired cards 22*b* of the deck 22 from moving in response to the continued movement of the magnet 24 in the direction 46*a* of arrow 46. Resetting or lowering the set sort bars 48-2 and 48-6 after the initial card separation phase enables the selected cards 22*a* to continue movement in the direction 46*a* of arrow 46 in response to movement of the magnet 24 in this direction by reason of the removed portion 40 thereof being aligned with the elevated or set lock bar 50. With the lock bar 50 set and the sort bars 48 all in their lower, reset position, the magnet 24 is advanced further in the direction 46a of arrow 46 to the position shown in FIG. 23E, further separating the desired cards 22*a* from the undersired cards 22*b***. At this point, the final card selection phase of the retrieval cycle is complete, marking the completion of the card retrieval operation.

The document retrieval system of this invention, of which the card selector 8 (FIGS. 23A–23E) constitutes an important element in the preferred form thereof shown in FIGS. 1 and 2, includes in addition to a selector 8-1 of the type described in connection with FIGS. 23A-23E, a mass memory or document bank 60 of addressable card decks 22, each generally similar to the card deck 22 described in connection with the selector 8 of FIGS. 23A–23E. The card decks 22 are stored in individual trays 11, to be described later. In a preferred form of bank 60, there are 60 trays 11 arranged in four stacks of 15 each. The card trays 11 can be retrieved, in a manner to be described, under control of the keyboard console 10 by appropriate entry of a two-digit tray address, and transported to the stationary card selector 8-1 which, as noted, is substantially identical to the card selector 8 described previously in connection with FIGS. 23A–23E. The trays 11 of document bank 60 contain documents which are encoded in much the same manner as described in connection with cards 22 located in selector 8 of FIGS. 23A–23E, and once retrieved and positioned within the selector 8-1 are searched to eject the desired card, such as card 22a-1 of deck 22-1 in much the same manner as cards 22a of deck 22 were selected in connection with the description of FIGS. 23A–23E. Following selection of a card 22a-1 from a deck 22-1 of a retrieval tray 11-1 in selector 8-1, the tray is returned to its appropriate storage position within the document bank 60, in a manner to be described.

Figure 1:
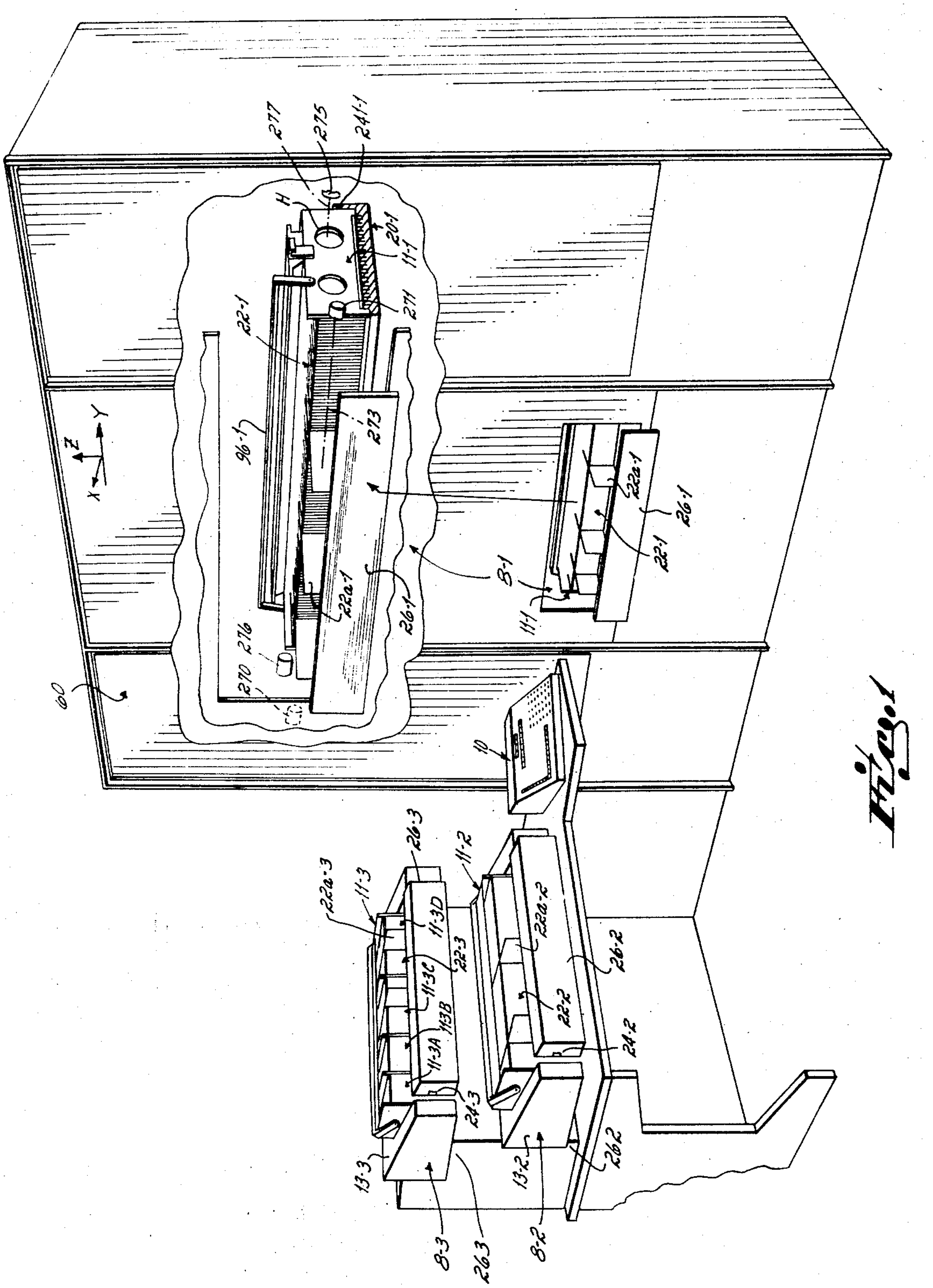
FIG. 1 is a perspective view of the document storage system of this invention showing the relative orientation of the retrievable tray bank, main selector and buffer selectors.
Figure 2:
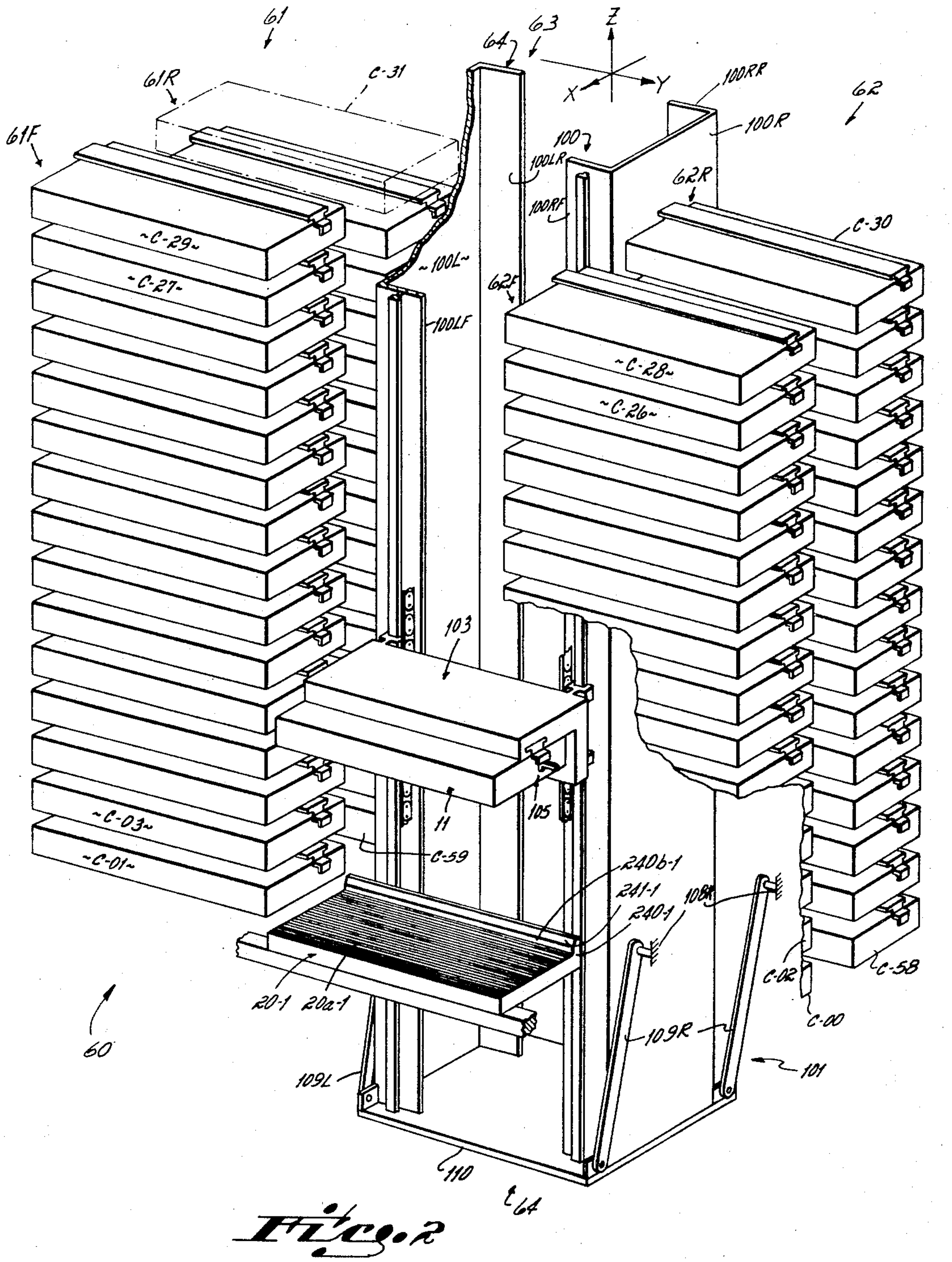
FIG. 2 is a diagrammatic perspective view, partially broken away, of the retrievable tray arrays, tray retriever and main selector.

The system of this invention as shown in FIG. 1, further includes two independent buffer selectors 8-2 and 8-3, each having associated with it a tray 11-2 and 11-3 of cards 22-2 and 22-3 encoded in the manner described in connection with FIGS. 23A-23E. While only two buffer selectors 8-2 and 8-3 are shown, the quantity of such independent buffer selectors can be more or less than this number. The buffer selectors 8-2 and 8-3 and associated trays 11-2 and 11-3 of cards 22-2 and 22-3 are substantially identical to selector 8-1 and its tray 11-1 of cards 22-1. The independent buffer selectors 8-2 and 8-3 search their respective trays 11-2 and 11-3 of encoded cards 22-2 and 22-3 simultaneously with the searching of cards 22-1 of tray 11-1 located in selector 8-1. The trays 11-2 and 11-3 of selectors 8-2 and 8-3 in whole or in part, can be divided into compartments for holding cards with respect to which specific functions are to be carried out.

For example, tray 11-2 of selector 8-2 in its entirety may be utilized for temporarily holding, such as for a day or week, new cards which are ultimately to be stored in bank 60. By temporarily storing new cards which are ultimately destined for bank 60, in the buffer selector tray 11-2 of buffer selector 8-2, such temporarily stored new cards are available for search and selection notwithstanding that the new card has not yet been positioned in its particular tray 11 normally stored in the bank 60. For example, if a new card destined to be stored in a tray 11 contained within the bank 60 is first inserted in tray 11-2 of buffer selector 8-2 and such new card sought to be retrieved by entry of its address in the keyboard 10, the card will be selected even though not yet in its own tray. The only difference between selection of a new card temporarily stored in the tray 11-2 of buffer selector 8-2 is that selection of the new card is manifested by its ejection from the card tray 11-2 of the buffer selector 8-2, rather than from the retrieved tray 11-1 located in the selector 8-1 where the new card will ultimately be filed and which was retrieved from its storage position within the bank 60 and transported to the selector 8-1 as a consequence of entry of the card address in the console 10. In a similar manner, other buffer selector trays, such as tray 11-3 of buffer selector 8-3 can be dedicated to temporarily holding cards retrieved from bank 60 with respect to which other functions are to be performed. For example, buffer selector tray 11-3 of buffer selector 8-3 may be divided into compartments 11-3A, 11-3B, 11-3C, and 11-3D into which cards retrieved from bank 60 are temporarily stored while awaiting duplication, copying, updating, or refiling in the document bank 60. In certain system installations the cards 22 stored in trays 11 of the document bank 60 must periodically be retrieved and copied. Often the actual copying of cards retrieved from the document bank 60 in a given day will be made at one time, e.g., at the end of the day, while the system operator may actually retrieve the cards from the document bank 60 which are to be copied intermittently throughout the entire day. As the cards to be copied are retrieved from the document bank 60 and presented to the operator by the selector 8-1 as a consequence of retrieval and searching of the trays 11-1 brought to selector 8-1 containing the cards to be copied, the operator places the retrieved cards in the copy compartment 11-3B of buffer selector tray 11-3 of buffer selector 8-3. At the end of the day the retrieved cards to be copied, which have been placed in compartment 11-3B, are removed and copied. Following this the cards are placed in the re-file compartment 11-3B.

Eventually, the cards in the duplicate, copy, and update and re-file compartments 11-3A through 11-3D of buffer tray 11-3 (and new cards located in the in-file buffer tray 11-2) are returned to their respective trays in the document bank 60. Such may occur on a weekly basis, or on some other basis, either more or less frequently. Importantly, however, the cards which have been retrieved from the document bank 60 and which are to be copied, duplicated, or up-dated and located in their respective duplicate, copy and update buffer tray sections 11-3A, 11-3B, 11-3C, remain in the system and susceptive of being searched at all times except for the brief period when they are actually removed from their respective buffer tray sections at the end of the day and duplicated, copied, or updated. Thus, by virtue of buffer tray 11-3 which is searched simultaneously with respect to the tray 11-1 of selector 8-1, cards which have been retrieved from the document bank 60 and which are to be operated upon at a later date remain in the system and capable of retrieval, albeit from the buffer selector tray 11-3, on a continuous basis except for the very brief period when they are actually removed from the buffer selector tray 11-3 for duplicating, copying, updating, or the like.

The document bank 60, as best shown in FIG. 2, 8, 9 and 10, includes opposed left and right matrices 61 and 62 of individual tray storage bins, or crypts, C which are located on opposite sides, and open onto a central aisle 63. Located in the aisle 63 separating the left crypt matrix 61 and the right crypt matrix 62 is a tray retriever 64, to be described in detail later, which transports selected trays 11 between their respective crypts C and the selector 8-1 under control of the keyboard console 10 (FIG. 1). The left matrix 61 of crypts C includes a front vertical column, or stack, of crypts 61F, and a rear vertical column, or stack of crypts 61R, each preferably including 15 vertically superimposed crypts. Similarly, the righthand crypt matrix 62 includes a front vertical column, or stack, of crypts 62F and a rear vertical column, or stack, of crypts 62R, also preferably including 15 vertically superimposed crypts each. While in the preferred embodiment of this invention two columns of crypts per matrix are provided with each column having 15 crypts, it is to be understood that the number of columns per matrix and/or the number of crypts per column can be varied to suit the needs of the particular application with, of course, suitable modifications being made to the tray retriever 64 to facilitate retrieval of trays from the modified matrix configuration. In a preferred form and to facilitate identification of the crypts C of bank 60, the crypts of the left front column 61F are numbered, from bottom to top, C-01, C-03, C-05, . . . C-29, while crypts of the left rear column 61R are numbered, from top to bottom, C-31, C-33, C-35, ... C-59. The crypts of the right front column 62F are numbered, from bottom to top, C-00, C-02, C-04, . . . C-28, while the crypts of the right rear column 62R are numbered, from top to bottom, C-30, C-32, C-34, . . . C-58.

As used herein the tray designation 11-1 refers to any tray from bank 60 which is being transferred from or to, or is positioned on, platen 20-1 of selector 8-1. Further, as used herein tray designations 00, 01, . . . 59 designate trays stored in crypts C-00, C-01, ... C-59 of bank 60.

The crypts C are identical and therefore, only one crypt in the front left crypt column 61F is described. This crypt includes a pair of elongated parallel support members 65 and 66 which are generally L-shaped in cross-section and preferably fabricated of angle iron. The crypt shelf members 65 and 66 each have their vertical sections fixedly secured to appropriately positioned vertical posts 67, 71 and 68, 72 respectively, of a main frame support assembly MF. Fixedly secured to the upper surface of the horizontal sections of crypt shelf members 65 and 66 are elongated parallel guide 69 nd 70 which are preferably L-shaped in cross-section and fabricated of rugged, low-friction material such as tetrafluoroethylene resin. The upper surfaces **69*b* and 70*b* of the horizontal sections of guide members 69 and 70 function as sliding guide supports for the bottom front edge 79 and bottom rear edge 80 of a tray which is adapted to be stored in the crypt C. The vertical position of the shelf members 65 and 66 of each crypt are selected such that when a tray stored therein is positioned on guide members 69 and 70 the bottom edges 75*a* and 76*a* of the tray end walls 75 and 76 will be horizontal. The horizontal portions of the guide members 69 and 70, at the ends thereof located at the opening of crypt C adjacent the aisle 63 are beveled to provide a falcrum F to facilitate ease of insertion of a tray 11 into the crypt, as shown in FIGS. 3A, 6A, 6B and 6C by reference numerals 69*a* and 70*a***.

The tray Supports 65 and 66 of crypt C are angled very slightly with respect to the horizontal or X-Y plane. The angulation if approximately one-eighth inch per 25 inches of crypt shelf length, and is in a direction such that the ends of the crypt shelf members 65 and 66 secured to posts 67 And 68 adjacent the crypt opening at the aisle 63 are located higher than their opposite, outboard ends secured to vertical posts 71 and 72. Inclination of the crypt shelf members 65 and 66 in the manner described eliminated the tray/shelf member alignment problem which would normally be present were the shelf members 65 and 66 to be disposed in parallel, end-to-end relationship to a tray being inserted into its crypt by the tray retriever 64.

Figures 3, 4, 5, 6, 7:
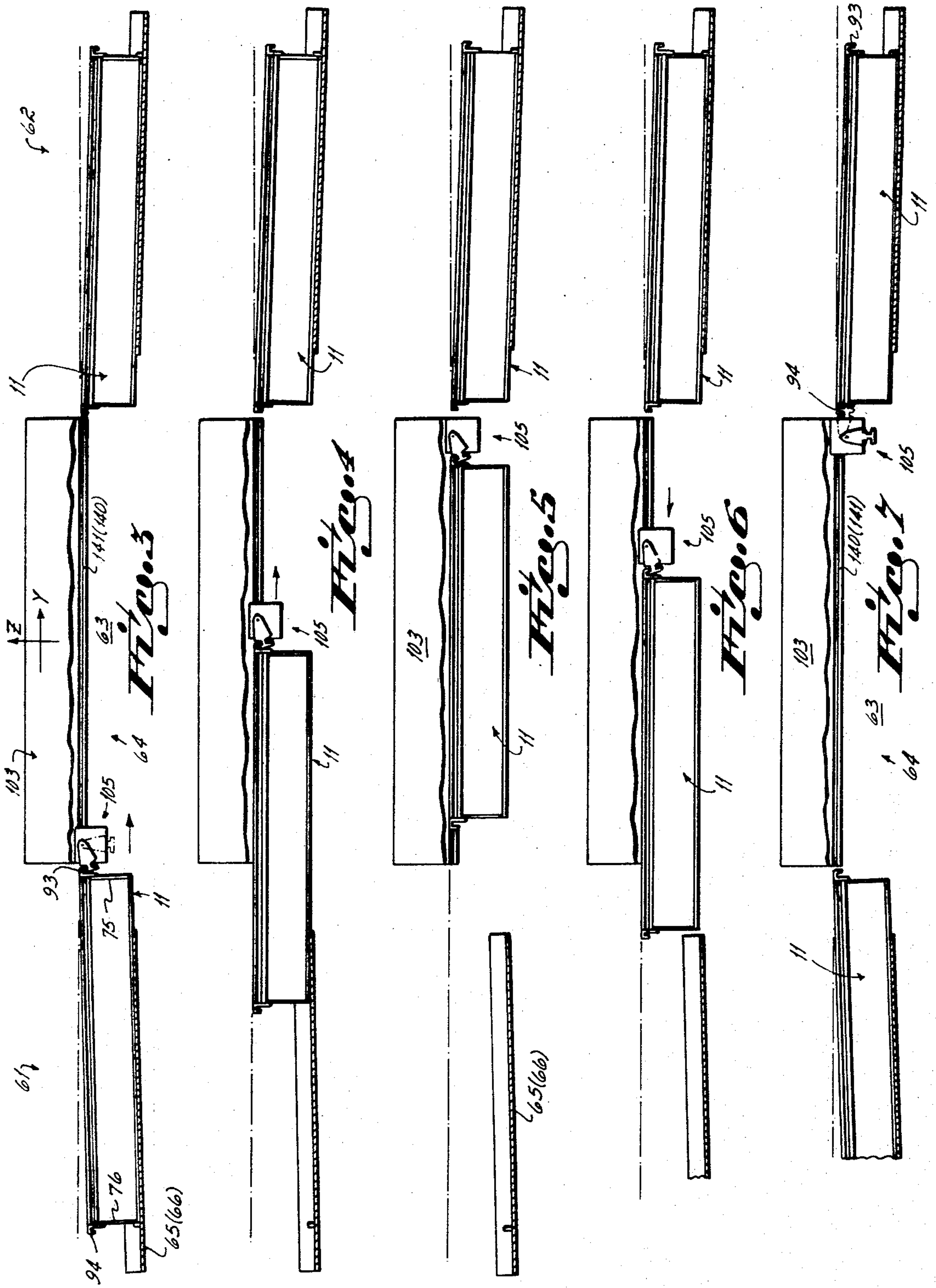
Figures 3A, 6A:
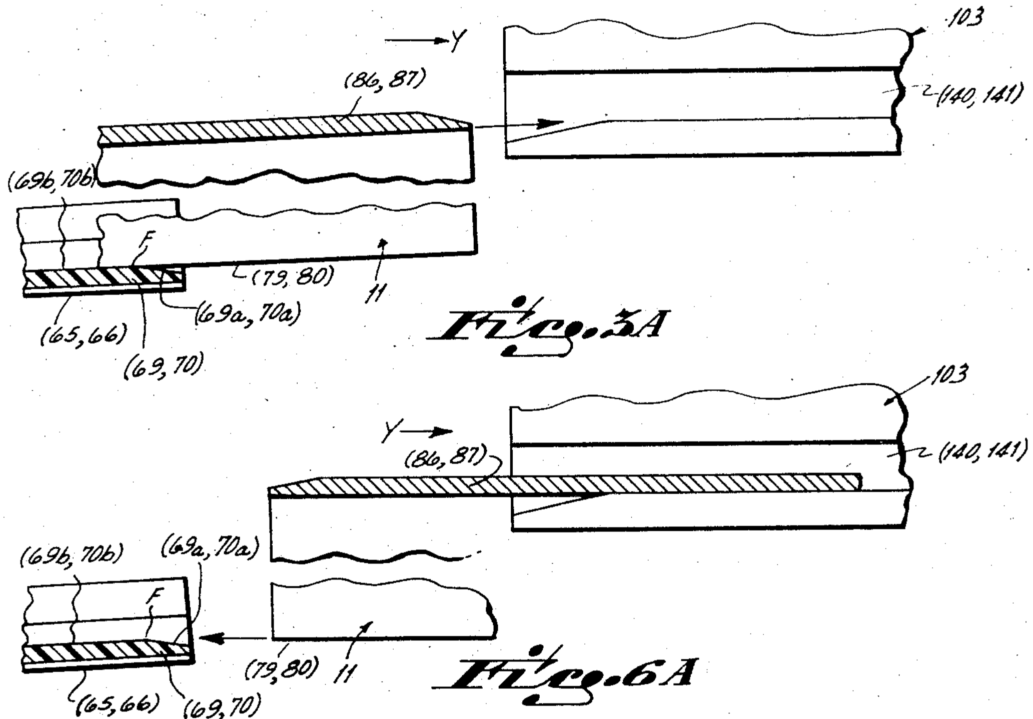

When a tray 11 is supported by the elevator 103, the tray is horizontal (FIGS. 6A and 6B). As the tray is slidingly transferred into the crypt C, the horizontal bottom bars 79, 80 thereof initially slide horizontally on a fulcrum F formed by the junction of the surfaces of beveled end **69*a*, 70*a* and main section 69*b*, 70*b* (FIG. 6B) of guides 69, 70. Eventually, as the horizontally sliding tray 11 moves further into the crypt C, the tray center of gravity CG moves outboard of the fulcrum F, whereupon the tray pivots counterclockwise (FIG. 6C) about the fulcrum to become parallel to support surfaces 69*b*, 70*b*. Further, movement of the tray into the crypt C causes the tray to slide along guides 69, 70 in a downward, slightly inclined direction parallel to surfaces 69*b*, 70*b*. When a tray is removed from a crypt, the foregoing steps are reversed in sequence with the tray first moving in an upwardly, slightly inclined direction parallel to surfaces 69*b*, 70*b*; thereafter pivoting clockwise about fulcrum F, when tray center of gravity CG is inboard of the fulcrum to a horizontal disposition established by engagement of the tray and elevator 103**; and finally sliding horizontally onto the elevator.

As noted, the foregoing description of a crypt C has been made with respect to a typical crypt located in column 61F. It is to be understood that crypts C of columns 61R, 62R and 62R are constructed in a similar fashion.

The openings at the aisle 63 of crypts C-01, C-03, . . . C-29 in the left front column 61F are vertically aligned and equally spaced in a vertical direction. The aisle openings of the crypts C-31, C-33, . . . C-59 in the left rear column 61R are also vertically aligned and equally spaced in a vertical direction. In addition, the openings of all crypts C-01, C-03, . . . C-59 in the left matrix 61 are in a common vertical X-Z plane. Similarly, crypts C-00, C-02, . . . C-28 of right front crypt column 62F have their openings at aisle 63 in a condition of vertical alignment and substantially equally spaced in a vertical direction. The openings of crypts C-30, C-32, . . . C-58 of right rear crypt column 62R are also in vertical alignment and equally spaced vertically. The openings of all crypts C-00, C-02, . . . C-58 of the right matrix 62 are in a common vertical X-Z plane. Finally, the openings of crypts C-01, C-03, . . . C-29 are directly oppositely disposed with respect to the openings of crypts C-00, C-02, . . . C-28, respectively. Similarly, the openings of crypts C-31, C-33, . . . C-59 are directly opposite the openings of crypts C-30, C-32, . . . C-58, respectively. The crypt openings of any given crypt level, such as the opening of the lowest level of crypts C-01, C-59, C-00, and C-58, are in the same horizontal or Z plane.

The trays 11 (see FIGS. 19, 20 and 21), which are identical in construction, each include spaced parallel vertical end panels 75 and 76 of generally rectangular configuration. Rigidly interconnecting end panels 75 and 76 is an elongated rectangular rear panel 77. The opposite vertical side edges of the rear panel 77 are rigidly secured to the vertical rear edges of the side panels 75 and 76. Spanning the tray 11 along the bottom at the front and rear thereof, are spaced parallel elongated front and rear card support bars 79 and 80. The card support bars 79 and 80 at their opposite ends are rigidly secured to the side panels 75 and 76 with the front bar 79 positioned between the lower front corner of the side panels and the rear card support bar 80 positioned between the lower rear corner of the side panels. Card support bars 79 and 80, when cards 22 are properly positioned in the tray 11, underlie the lower front and lower rear corners of the cards, providing support therefor.

DIsposed between the side walls 75 and 76 are a plurality of divider panels 82 of a generally planar construction. The divider panels 82 are parallel to the side walls 75 and 76 and generally equally spaced therebetween. A horizontal tab 83 extending from the rear vertical edge of each divider panel 82 is rigidly secured to the inside surface of the rear panel 77 to support the divider panels in their proper position.

Spanning the top of the tray 11 is an elongated bracket 85 which supports, along its front and rear edges, horizontally extending front and rear suspension lips 86 and 87. The suspension lips 86 and 87 are parallel to each other as well as parallel to the rear walls 77 and the card supports 79 and 80. The Suspension lips 86 and 87, in a manner to be described, facilitate transfer of a tray between its respective crypt C and the tray retriever 64. The elongated bracket 85 is secured in place atop the tray 11 by suitable end fasteners (not shown) which anchor the ends of the bracket 85 to the top edge of the tray side walls 75 and 76 and by intermediate fasteners 90 which secure the brackets to the top edge of vertical support plates 91 which are interspersed at suitable points between divider panels 82. Panels 91 are fixed to the rear wall 77 and the card supporting bars 79 and 80 by fasteners (not shown). The plates 91, in addition to providing means for securing the bracket 85 in position atop the tray, also function as divider panels similar to divider panels 82.

Projecting outwardly from he exterior surface of side walls 75 and 76 are tray removal lips 93 and 94. Lips 93 and 94 are generally horizontally disposed centrally of the side panels 75 and 76 and extend from front to rear approximately one-third the distance between the front and rear vertical edges of the side panels 75 and 76. The tray removal lips 93 and 94, when engaged by an appropriately configured hook member of the tray retriever 64, to be described, permits a tray to be transferred from storage in its respective crypt C to the tray retriever. For any given tray stored in a crypt C only one lip 93 or 94 need actually be provided, namely, lip 93 for trays stored in crypts located in the left matrix 61 and lip 94 for trays located in crypts in the right matrix 62. However, to facilitate use of the tray 11 in crypts of either the left matrix 61 or the right matrix 62, lips 93 and 94 are provided on both side panels 75 and 76.

To prevent and permit ejection of cards from the tray 11 via the front of the tray which is not provided with an enclosing wall structure, a horizontal card retention arm 96 is provided which is movable between a lower position shown in solid lines in FIGS. 18 and 21 and an upper position shown in phantom lines in FIG. 18. Retention arm 96 is L-shaped in cross-section, and in its lower card retaining position mates with the upper front corner of side sections 75 and 76 and the separator walls 91. When in the card retention position shown in FIG. 21, the vertical portion of the card retention arm 96 extends below the upper horizontal edges of cards 22 stored in the tray, preventing the stored cards from sliding horizontally out the otherwise open front of the tray, that is, sliding in a rightwardly direction as viewed in FIG. 21. To facilitate movement of the card retention arm 96 between its lower, card retaining position and its upper, card removal position, arms 96A and 96B are provided. Arms 96A and 96B are disposed parallel and outboard of side walls 75 and 76 and have one of their respective ends pivotally secured to side walls 75 and 76 and the other of their respective ends rigidly secured to opposite ends of the card retention arm 96. Extending laterally outwardly from the upper edge of arms 96A and 96B are ears 96A' and 96B' which, in a manner to be described, engage stationary stops 280 (FIGS. 17 and 18) associated with the selector 8-1 to facilitate automatic elevation of the card retention arm 96 to the upper, card removal position shown in phantom in FIG. 18 as the tray 11-1 is lowered onto the platen 20-1 of selector 8-1 by the tray retriever 64.

For reasons to become apparent hereafter, holes H are provided in the rear section of tray walls 75, 76, 82 and 91. The holes H of panels 75, 76, 82 and 91 are in horizontal alignment.

The trays 11, in a preferred form, are constructed to hold approximately 2,000 cards. By virtue of inclusion in the tray 11 of divider walls 82 and 91 a tray can be filled with cards to an extent substantially less than its total capacity while still permitting the cards to remain in a generally face-to-face vertical disposition as required to facilitate selection of a card by the selector 8-1 when the tray is on the selector platen 20-1.

The tray retriever 64, which is located in aisle 63 between the left and right tray matrices 61 and 62, includes a vertically disposed column or tower 100. Tower 100 is mounted for movement in the X direction by a pendulum support assembly 101 between a forward position (shown in solid lines in FIG. 13) and a rear position (shown in solid lines in FIG. 10 and phantom lines in FIG. 13). The tray retriever 64 further includes an elevator 103 which is mounted for selective vertical movement in a Z direction to positions of alignment with different ones of the crypt levels of bank 60 and to a vertical position appropriate to deposit on selector platen 20-1 a tray 11-1 carried by the elevator 103. The tray retriever 64 also includes a tray puller mechanism 105 mounted for horizontal sliding movement in the Y direction on elevator 103 between a left position (shown in phantom lines in FIG. 15) and a right position (shown in solid lines in FIG. 15). With reference to FIG. 3, the tray puller mechanism 105 is shown engaging the lip 93 of a tray in the crypt C in the left matrix 61 prior to transferring the tray from the crypt to the elevator 103. FIG. 4 shows the puller mechanism 105 after it has engaged the left matrix tray and partially transferred it to the elevator 103, while FIG. 5 shows the puller mechanism after it has completely transferred the tray from the left matrix 61 to the elevator. FIG. 6 shows the puller mechanism 105 in the process of returning a tray to a crypt in the left matrix 61, while FIG. 7 shows the puller mechanism after it has completed transfer of a tray from the elevator 103 to a crypt in the right matrix 62.

The tower 100 includes vertically disposed spaced parallel right and left side members 100R and 100L, each having inwardly extending front flanges 100RF and 100LF disposed in a common Y-Z plane and inwardly disposed rear flanges 100RR and 100LR also disposed in a common Y-Z plane. Secured to the front flanges 100RF and 100LF are vertically disposed spaced parallel guide rails 106R and 106L which are T-shaped in cross-section. The guide rails 106R and 106L cooperate with upper and lower pairs of guide blocks 107R, 107R and 107L, 107L secured to the rear of the elevator 103 for guiding the elevator in a vertical Y-Z plane.

The tower 100 further includes, as noted previously, a pendulum assembly 101 which mounts the tower for movement in an X direction between a forward and a rear position shown in solid lines in FIGS. 13 and 10, respectively. The pendulum assembly 101 includes a horizontal platform 110 which is generally rectangular in configuration. Extending upwardly from the right and left side edges of the platform 110 are side supports 111R and 111L. (See FIGS. 10-14). Side supports 111R and 111L are fixedly secured to the platform 110 and facilitate rigid interconnection of the tower side members 100R and 100L to the right and left sides of the platform 110. A right pair of equal length parallel links 109R, 109R and a left pair of equal length parallel links 109L, 109L are interconnected between front and rear corners of the right and left sides of the platform 110 via suitable pin couplings. At their upper ends links 109R, 109R and 109L, 109L are connected to the right and left cross members 108R and 108L of the main frame MF via suitable pin couplings.

When the platform 110 is in its lowermost position corresponding to the center of its arc of movement wherein the parallel links 109R, 109R and 109L, 109L are vertically disposed, the puller mechanism 105 slidably mounted on the elevator 103 is located equidistant between the Y-Z plane containing tray removal lips 93, 94 of trays located in the front crypt columns 61F and 62F and the Y-Z plane containing the tray removal lips 93, 94 of trays in crypts of the rear columns 61R and 62R. In the forward position of platform 110 (shown in solid lines in FIG. 13), puller mechanism 105 is aligned with the Y-Z plane containing tray removal lips 93, 94 of trays stored in the front crypt columns 61F and 62F, while in its rear position shown in solid lines in FIG. 10, the platform 110 is positioned such that the puller mechanism 105 is aligned with the Y-Z plane containing the tray removal lips 93, 94 of trays stored in rear crypt columns 61R and 62R.

To hold the platform 110 in its forward position shown in solid lines in FIG. 13, or alternatively in its rear position shown in solid lines in FIG. 10, two toggle mechanisms 115, 115 are provided, one on either side of the platform. Toggle mechanisms 115, 115 are identical and each includes a pair of links 116, 117 which are pivotally connected together by pin 118. Toggle link 117 has its other end pinned by a pin 124 to an upstanding lug 119 of the platform 110, while link 116 has it other end keyed to a horizontal drive shaft 120 which is mounted for rotation about its axis in journal bearings fixed to the main frame MF. Shaft 120 has keyed to it a sprocket 121 which is driven via a chain 122 from a motor-driven sprocket 123 which is keyed to a shaft 114 journalled in suitable bearings (not shown) fixed to the main frame MF. Shaft 114 is driven by motor 113.

The links 116, 117 of toggle mechanisms 115, 115, when in the position shown in FIG. 10, lock the platform 110 in its rear position. Similarly, when toggle links 116 and 117 are in the position shown in FIG. 13, the platform 110 is locked in its forward position shown in solid lines in FIG. 13. To transfer the platform 110 from the rear position shown in FIG. 10 to the forward position shown in solid lines in FIG. 13, toggle link 116 is rotated counterclockwise (as viewed in FIG. 10) via the chain 122 and associated sprockets 121 and 124. Rotation of link 116 in a counterclockwise direction elevates the connecting pin 118 to a point above the line joining the centers of pin 124 and shaft 120, terminating the locking action of toggle links 116 and 117 (see FIG. 11). The platform 110, as a consequence of its weight and that of the tower 100 and elevator 103 supported by it, proceeds to swing leftwardly successively passing through the intermediate positions shown in FIGS. 11 and 12. Ideally, and assuming no losses in energy due to friction, the platform 110 would swing to the forward position depicted in solid lines in FIG. 13 without assistance from driven shaft 120. However, since there are frictional losses, it is necessary to drive the platform approximately the last one-sixteenth inch of its travel to the forward position depicted in solid lines in FIG. 13. This drive motion is imparted to the platform 110 by the shaft 120 which is driven in a counterclockwise direction during the last one-sixteenth inch of travel of the platform toward the forward position depicted in solid lines in FIG. 13.

Once the platform has reached the full forward position shown in solid lines in FIG. 13 the platform is locked in place by the action of toggle links 116 and 117 which are now disposed such that connecting pin 118 is positioned along the line connecting pin 124 and shaft 120. The platform 110 remains in the forward position depicted in FIG. 13 until the toggle link 116 is rotated clockwise (as viewed in FIG. 13) by the motor-driven shaft 120 whereupon the pin 118 moves above the line connecting pin 124 and shaft 120 to release the locking action of the toggle mechanism 115. The platform 110 thereupon moves rearwardly to the position shown in FIG. 10 and in its last one-sixteenth inch of travel is positively driven to the final rear position by the shaft 120.

To facilitate de-energization of the motor 113 which drives the shaft 120 when the platform 110 has reached its full front and rear positions, limit switches 125 and 126 mounted to the main frame MF are provided in combination with a cam 127 secured to the driven shaft 120. Switch 126 is tripped by the cam 127 when the platform 110 has reached the full forward position, thereby de-energizing the motor 113 which drives shaft 120. Switch 125 is tripped by the cam 127 when the platform 110 has reached the full rear position depicted in FIG. 10, thereby de-energizing the motor 113 which drives shaft 120.

The elevator 103 (see FIGS. 15–17) includes a rear vertical wall 130 disposed parallel to the guide rails 106R and 106L mounted to tower side wall flanges 100RF and 100LF. Secured to the rear wall 130 are upper and lower right guide blocks 107R, 107R and upper and lower left guide blocks 107L, 107L, which are provided with vertical T-shaped slots which slidably engage the T-shaped guide rails 106R and 106L of the tower 100 to facilitate vertical sliding motion of the elevator 103 relative to the tower. The elevator further includes a horizontal top plate 131 of generally rectangular configuration which is secured at its rear edge to the upper horizontal edge of the elevator rear wall 130, a front wall 132 also of generally rectangular configuration which is secured at its upper edge to the front edge of the top panel 131, and right and left vertical spaced parallel side walls 133 and 134 secured to the front top and rear walls with respect to which the side panels are perpendicular. Vertically disposed elongated T-shaped reinforcing members 136 and 137 are fixed to the interior surface of the rear wall 130 behind the guide blocks 106R, 106R, and 106L, 106L. Spanning the opposite side walls 133 and 134 are a pair of horizontally disposed spaced parallel front and rear tray guides 138 and 139 provided with spaced opposed parallel horizontal slots 140 and 141 which slidably receive front and rear suspension lips 86 and 87 secured to the top of the tray 11. The vertical dimension of the tray suspension slots 140 and 141 of tray support blocks 138 and 139 is approximately three times the vertical dimension of the tray suspension lips 86 and 87 to permit the elevator 103 to overtravel slightly in the downward direction in the course of depositing a tray 11-1 suspended from guide blocks 138, 139 onto the platen 20-1 of selector 8-1. Such overtravel reduces the criticality of positioning of the elevator 103 in the vertical direction during the deposit of the tray 11-1 on the platen 20-1 of selector 8-1.

To facilitate vertical positioning of the elevator 103 with respect to the tower 100, a pair of left and right endless drive chains 142, 142 are provided which train over upper sprockets 143 (FIG. 13) rotatably mounted on a horizontal shaft 144 journalled at its opposite ends in tower side walls 100R and 100L, and which train at their lower ends over a pair of driven sprockets 145, 145 keyed to a horizontal drive shaft 146 journalled at its opposite ends in tower side walls 100R and 100L. Chains 142, 142 are connected to the elevator 103 to move it vertically by pins 142PR and 142PL which engage guide blocks 107R and 107L. A pair of front idler sprockets 147, 147 mounted on a horizontal shaft 148F journalled between tower side walls 100R and 100L engage the forward reach of the chains 142, 142, while a pair of rear idler sprockets 149, 149 mounted on a horizontal shaft 148R journalled between tower side walls 100R, 100L engages the rear reach of chains 142, 142. Drive shaft 146 which is keyed to chain drive sprockets 145, 145 is alternatively driven from a high speed d.c. motor 150 (FIG. 14) via first and second reduction pulley arrangements 151 and 152 and a two-speed motor 154 via a reduction pulley arrangement 155.

High-speed motor 150 is secured to left tower side wall 100L with its shaft 156 extending horizontally outward. A small diameter pulley 157 keyed to high-speed motor shaft 156 drives, via a belt 160, a large diameter pulley 158 keyed to a shaft 159 journalled in side walls 100R and 100L, to produce a first speed reduction. A small diameter pulley 161 keyed to shaft 159 drives, via a belt 164, a large diameter pulley 163 keyed to shaft 146, introducing a second speed reduction. Thus, high-speed motor 150 mounted to left tower side wall 100L drives the chains 142, 142 via two speed reduction units 151 and 152.

The high speed motor 150 is utilized to drive the elevator 103 at high speed, e.g., 4–6 feet per second, until it nears its vertical destination, e.g., comes within slightly less than one crypt level from it, whereupon motor 150 is electrically braked to rapidly and temporarily arrest the motion of the elevator. Following high speed motion of the elevator 103 by motor 150 and the subsequent braking of the motor 150 and arrest of motion of the elevator 103 as the elevator nears its vertical destination, drive of the elevator is transferred from the high-speed motor 150 to the dual-speed motor 154. Motor 154 is initially operated at a medium speed, for example, 4 inches per second. The elevator 103 continues to be driven toward its destination by the motor 154 at medium speed until the elevator is positioned within approximately one inch of its destination whereupon the motor 154 is driven at a very slow speed, for example, 0.4 inches per second. The elevator 103 continues to be driven at low speed by the motor 154 until the elevator is positioned at the desired vertical position or destination whereupon the shaft 166 of the motor 154 is electrically locked in position to hold the elevator at the desired vertical destination position.

The medium speed motor 154 drives the chains 142, 142, which are pinned to the elevator 103, via a speed reduction unit 155 which includes a small diameter pulley 167 keyed to shaft 166 of motor 154, a large diameter pulley 168 keyed to shaft 146 and a belt 169 which trains over pulleys 167 and 168. Motion of driven pulley 168 is imparted to chains 142, 142 via the shaft 146 and the sprocket 145 over which the chains 142, 142 train. In a preferred form, the dual-speed motor 154 is a synchronous a.c. motor, the speed of which is proportional to the frequency of the electrical power source energizing it. Medium speed, e.g., 4 inches per second, from motor 154 is obtained by applying 60 Hertz a.c. power to the motor. Low speed operation of the motor 154 is obtained by applying low frequency d.c. pulses to the motor. Shaft 166 of motor 154 is electrically locked in place when the elevator has reached its vertical destination position by applying steady d.c. current to the motor 154.

To control energization of the high-speed d.c. motor 150, a rotating commutator disc 170, to be described in detail hereafter, is provided. Commutator disc 170 is driven in synchronism with the elevator-driving chains 142, 142 via a gear reduction unit 171 consisting of a small diameter gear 172 formed on the end of drive shaft 146 and a large diameter gear 173 secured to the shaft 174 on which commutator 170 is keyed. Thus, the angular position of the commutator disc 170 at any instant is directly correlated to the vertical position of elevator 103. Associated with the synchronously driven commutator disc 170 are a plurality of brushes S0–S15 which correspond to the vertical level of the selector 8-1 and the fifteen different levels of the crypts C, respectively. For any given vertical destination or level to which it is desired to position the elevator 103, the brush S0–S15 corresponding to that level will be energized by a suitable power supply (not shown). Energization of the brush corresponding to the desired level will, via the commutator 170, energize the high speed motor 150 until the elevator approaches within a predetermined distance from the desired destination, namely, to within slightly less than one level. When the elevator 103 does approach within the predetermined vertical distance of the desired destination level the commutator disc 170, which is moved in synchronism with the vertical motion of the elevator, has rotated to an angular position in which electrical power from the supply, which energizes the brush S0–S15 corresponding to the desired destination level, is no longer electrically connected by the commutator to the high speed motor 150. When this occurs, the high speed motor 150 is de-energized and via suitable circuitry (not shown) electrically braked to rapidly and temporarily arrest the motion of the elevator.

At this point the dual speed motor 154 becomes energized from a suitable a.c. source to drive the elevator 103 at a medium speed. Medium speed motion of the elevator continues until the elevator arrives within 1 inch of its destination whereupon pulsed d.c. current is applied to the motor to drive it at a very slow speed. Slow speed elevator motion continues until the elevator has reached the desired destination level whereupon steady state d.c. current is applied to the motor 154 to lock the elevator at the desired position.

To facilitate determining when the elevator 103 has arrived within approximately one inch of its desired vertical destination position and motor 154 should be switched from medium speed to slow speed, flags 180 (FIGS. 15 and 15A) are provided at each crypt level as well as at the level of selector 8-1. Flags 180 are each in the form of a rectangular vertically disposed plate and project laterally from left tower wall 100L at their respective crypt level. The flags 180, which are in the same vertical plane, are each provided with a horizontal slot 180S which is equidistant and spaced approximately one inch from the upper and lower horizontal edges 180U and 180L of the flag plate. Cooperating with the flags 180 is a photo-detecting assembly 185 secured to the rear wall 130 of the elevator 103. Photo-detector assembly 185 includes a housing 186 in which are positioned, on opposite sides of the vertically aligned flags 180, a light source 187 and a phototransducer 188. A mask 189 secured to housing 186 is positioned between the plane of the vertically aligned flags 180 and the phototransducer 188. The mask 189 is provided with a horizontal slot 190 of substantially the same dimensions as the slots 180S of the flags 180. The slotted mask 189 effectively collimates light from source 187 which is received by phototransducer 188 to a relatively flat beam substantially coextensive with the slots 180S of flags 180.

In operation, after the elevator 103 has shifted to medium speed under control of the commutator 170, which occurs when the elevator is slightly less than one level away from the desired destination, the elevator continues to be driven by the motor 154 at medium speed until the photo-detector 185 detects either the upper edge 180U or the lower edge 180L, depending upon whether the elevator is moving vertically downwardly or vertically upwardly, of the flag 180 located at the desired crypt or selector level. Assuming the elevator is moving upwardly, when the photo-detector 185 detects the lower edge 180L of flag 180 at the desired crypt destination, the motor 154 is switched to low speed. Low speed operation continues until the photo-detector 185 detects slot 180S of the flag 180 located at the desired level, whereupon the motor 154 is stopped and its shaft electrically locked in position. At this point the elevator is located at the desired crypt destination level.

Commutator disc 170 and associated brush S-0 functions to cause the drive of elevator 103 to switch from high speed motor 150 to dual speed motor 154 operating at medium speed. Switching elevator drive from medium speed to low speed, and eventually to stop and electrically brake, is accomplished by the interaction of the flag 180 associated with the level of selector 8-1 and the photo-detector 185, in the manner previously described.

A limit switch 183 secured to the right tower side wall 180R is provided to sense that the elevator 103 has descended to a point wherein the tray 11-1 carried by it is properly deposited on the platen 20-1 of selector 8-1. Actuation of switch 183 is used to initiate a selection cycle for selectors 8-1, 8-2, and 8-3.

The tray puller mechanism 105 includes oppositely directed hooks 201 and 202 (FIGS. 16, 16A and 17) mounted at the end of an arm 203 which at its other end is keyed to the horizontal shaft 204 of a motor 205 having a housing 210. The motor 205 is bi-directional and can alternatively pivot the hook arm 203 in a vertical plane about shaft 204 between the left position shown in solid lines in FIG. 16A and a right position shown in phantom lines. In the left position of arm 203 shown in solid lines, the hook 201 can engage a tray removal lip 93 of a tray for transfer between the crypt C in which it is stored in the left matrix 61 and storage on the elevator 103 suspended from the blocks 138 and 139 whose slots 140 and 141 engage the suspension lips 86 and 87 of the tray. Similarly, in the right position of the arm 203, shown in phantom lines, the hook 202 can engage the tray removal lips 94 to transfer a tray between its storage crypt in the right matrix 62 and storage on the elevator 103 where it is suspended by the slotted blocks 138 and 139.

Projecting outwardly from the inner end of hook arm 203 in opposite directions are a first cam lobe 206 and a second cam lobe 207 which cooperate with a movable actuator 208 of a switch 209 mounted to the housing 210 of the hook motor 205. Cam lobes 206 and 207 upon actuation of switch arm 208 effect de-energization of the hook motor 205 as the hook arm 203 reaches its extreme left and extreme right positions, respectively. A cam lobe 211 also projecting outwardly from the inner end of hook arm 203, and between cam lobes 206 and 207, cooperates with actuator arm 212 of a second switch 213 also secured to the housing 210 of the hook motor 205. Cam 211, in combination with actuating arm 212 of switch 213, senses when the hook arm 203 is in its centered position with the hook arm directed vertically downwardly. In a manner to be apparent from a later description of the operation of the control circuitry, cam 211 and switch 209 cooperate to assist in control of the positioning of hook arm 203.

Hook motor housing 210 is secured at its upper surface to a guide block 217 which is mounted for reciprocation in the horizontal Y direction on a pair of horizontal spaced parallel front and rear guide rods 215F and 215R which span and are secured at their opposite ends to elevator side walls 133 and 134. Guide rods 215F and 215R pass through spaced parallel horizontal bores formed in the guide block 217 which, as noted, is secured at its lower surface to the hook motor 205. To drive the guide block 217 and, hence, the hook motor 205, along guide rails 215F and 215R a chain 220 is provided which trains over idler sprockets 221, 222, 228 and 229 and a drive sprocket 223 mounted on downwardly extending shafts 221A, 222A, 223A, 228A and 229A journalled at their upper ends to the elevator top panel 131. Drive chain 220 is connected to guide block 217 via a scotch yoke mechanism including a block 225 which at its upper end is connected to the chain 220 via a vertical pin 226 and at its lower end slidably seated in a horizontal X-directed guide slot 227 formed in the upper surface of guide block 217.

When drive sprocket 223 rotates clockwise as viewed in FIG. 15, the pin 226 is at first driven in a 90° arc following the curvature of the idler sprocket 222 from a position overlying rear guide rail 215R to a position forward of the idler sprocket mounting shaft 22A. Continued driving motion of the sprocket 223 in a clockwise direction advances pin 226 leftwardly in a direction parallel to guide rails 215R and 215F until the pin is forward of idler sprocket shaft 221A, whereupon continued motion of the chain 220 as a consequence of clockwise movement of sprocket 223 advances the pin in a 90° arc until it is overlying rear guide rail 215R and displaced leftwardly of the idler sprocket shaft 221A. As the guide pin 226 moves in the manner described from a position overlying rear guide rail 215R and rightwardly of idler sprocket 22A to a position overlying rear guide rail but displaced leftwardly of idler sprocket 221A, slide block 225 first slides forwardly in the guide slot 227 formed in guide block 217, thereafter remains stationary relative to the guide block 217 as the guide block 217 traverses the guide rails from in front of idler sprocket 222A to a position in front of idler sprocket 221A, and finally moves rearwardly. The foregoing movement of slide block 225 reciprocates hook motor 205 from its extreme right position (solid lines in FIG. 15) to its extreme left position (phantom lines). Hook motor 205 is returned from the left position (phantom lines in FIG. 15) to the right position (solid lines) by reversal of the above described operation, i.e., by rotation of the drive sprocket 223 in a counterclockwise direction.

To bi-directionally drive the chain drive sprocket 223, a vertical drive shaft 230 having a square cross-section is provided. Shaft 230 is slidably received within a square cross-section bore formed in the shaft 223A to which the drive sprocket 223 is keyed, enabling the chain drive sprocket 223 to be driven by the shaft 230 regardless of the vertical position of the elevator 103. The shaft 230 at its lower end is drivingly coupled via coupler 235 to the vertically disposed shaft 231 of a bidirectional motor 232 mounted on a bracket 233 anchored to the platform 110 (FIG. 14).

To facilitate de-energization of the motor 232 when the hook motor 205 has been driven by the chain 220 to its extreme left and extreme right positions (shown in phantom and solid lines, respectively, in FIG. 15), a left limit switch 236 and a right limit switch 237 are secured to the left and right edges, respectively, of the inside front wall 132. The left limit switch 236 has a movable switch actuating arm 236A which is actuated by the front of reciprocating guide block 217 when the guide block has reached its extreme left position shown in phantom lines in FIG. 15. When switch 236 is actuated an indication is provided that the guide block 217 has reached its extreme lefthand position and, the motor 232 is appropriately de-energized to terminate drive of the chain 220. The right limit switch 237 has a movable actuator 237A which is designed to be actuated when the reciprocating guide block 217 reaches its extreme right position (solid lines in FIG. 15). Upon actuation of switch arm 237A by guide block 217 an indication is provided that the guide block has reached its extreme right position whereupon the motor 232 is de-energized to terminate driving motion of the chain 220.

To sense the presence of a tray 11-1 on the elevator 103, left and right tray sensing switches 238 and 239 having vertically reciprocable switch actuating arms 238A and 239A are provided. Switch arms 238A and 239A abut the upper surface of the front suspension lobes 86 of the tray 11-1 as the tray is being transferred onto the elevator support blocks 138 and 139 from its respective crypt C. Actuation of switches 238 and 239 in response to the presence of a tray on the elevator 103 is used for control purposes in a manner to become apparent from a description of the control circuitry provided hereafter.

The card selector 8-1 includes a stationary horizontally disposed planar platen 20-1 which is positioned within a housing 13-1 which is open at the top to permit a tray of cards 11-1 suspended by elevator 103 to be deposited on the platen. Selector housing 13-1 is open at the front to permit a horizontally movable drawer 26-1 reciprocable in the X direction to move between its inner position, wherein a transversely disposed elongated magnet 24-1 common at all the cards 22-1 in a tray 11-1 deposited on the platen 20-1 and in alignment with ferromagnetic chips 23-1 implanted in the leading edges of the cards magnetically attracts the ferromagnetic card chips, and an outer position to which the transverse elongated magnet 24-1 can advance in the process of selecting desired cards 22*a*-1 from the deck of randomly stored cards 22-1, in a manner described previously.

The platen 20-1 of selector 8-1, as noted in connection with FIGS. 23A–23E, is preferably in the form of a flat plate having a plurality of parallel, partially through blind slots disposed in the Y direction transverse to the X-directed sorting edges of cards 22-1 located in a tray 11-1 positioned on the selector platen. The blind slots correspond in number and position to the combined number of registration notches 35 and lock notch 36 formed in the sorting edge 32 of a card 22 properly positioned on the platen 20-1 prior to a selection operation. The blind slots opposite the registration notches 35 and the blind slot opposite the lock notch 36 are normal to the top surface 20*a*-1 of the platen 20-1.

An elongated sort bar 48 is positioned in each of the platen sorting bar slots and an elongated lock bar 50 is positioned in the platen lock bar slot. The sorting bars 48 and lock bar 50 are alternatively positionable in their respective slots in a lower or reset position wherein the upper edge of the bar is flush with the top surface 20*a*-1 of the platen 20-1, and an upper or set position in which the sorting bars and lock bar have their upper edges raised above the top surface of the platen into the respectively associated registration notches 35 and lock notch 36 with which they are aligned.

Suitable means (not shown) are provided for selectively setting and resetting the sorting bars 48 in accordance with the code of the card to be selected which is entered into the keyboard console 10, and for setting and resetting the lock bar 50 at the appropriate points in time in a card selection cycle. Additionally, suitable means (not shown) are provided for operating the drawer 26-1 between its outer and inner positions to select and return cards 22*a*-1 to the deck 22-1 of randomly stored cards in the tray 11-1 positioned on the platen 20-1 of selector 8-1. Suitable means for controlling and operating the drawer 26-1, sort bars 48 and lock bar 50 to facilitate selection of a card 22*a*-1 from a tray 11-1 of cards 22-1 positioned on the platen 20-1 of the selector 8-1 can be constructed in accordance with the teachings of Parry U.S. Pat. No. 3,478,877 and Kalthoff et al., U.S. Pat. No. 3,534,904, the disclosures of which are incorporated herein by reference.

To facilitate alignment of the registration notches 35 and lock notch 36 of the cards 22-1 stored in a tray 11-1 positioned on the platen 20-1 of the selector 8-1 with respect to the sorting bars 48 and lock bar 50 of selector 8-1 which are transverse and common to the sorting edges 32 of the cards 22-1, an elongated horizontal locating member or bar 240 (FIGS. 17 and 18) having a vertical surface 240*b* disposed parallel to the selector sort and lock bars is secured to the rear vertical edge of the platen. When drawer-mounted magnet 24-1 (FIG. 18) moves rearwardly to its closed position following deposit of a tray 11-1 on selector platen 20-1, the magnet urges the deposited tray and contained cards rearwardly against vertical locating surface 240*b*, to properly register the card notches 35 and 36 over the selector bars 48 and 50. Thus, proper registration of the notches of the deposited cards and the selector magnet and the fixed selector locating surface 240b, without regard or need for any criticality in the initial positioning in the X direction of the tray by the retriever 64.

The bar 240 includes a cam surface 241 which, as viewed in FIG. 17, slopes downwardly and leftwardly toward the drawer 26-1 and magnet 24-1. The cam surface 241 cams forwardly the rear card support bar 80 of the tray 11-1 as the elevator 103 deposits the tray on the platen 20-1, insuring that as the tray is lowered onto the platen by the elevator it will not become sandwiched between the top of the bar 240 and the elevator 103 which is traveling downwardly to deposit it.

To eliminate any criticality of positioning in the Y direction, of the trays 11-1 on the platen 20-1 by the elevator 103, the sorting bars 48-1 and lock bar 50-1 of the selector platen 20-1 are intentionally made longer in the Y direction than the tray 11-1 deposited thereon. Thus, and to the extent the sorting and lock bars 48-1 and 50-1 do exceed in length the length of the tray, the positioning of the tray, in the Y direction, on the platen 20-1 is not critical. Accordingly, and so long as the tray and panels 75 and 76 are positioned between the opposite ends of the sorting and lock bars 48 and 50, selection of cards 22-1 from the deposited tray 11-1 by selector 8-1 will occur regardless of the exact position in the Y direction in which the tray 11-1 is deposited on the platen 20-1 by elevator 103.

To eliminate criticality in the Z direction in the course of the deposit of a tray 11-1 on the platen 20-1 by the elevator 103, the vertical dimension of the tray suspension slots 140 and 141 of tray supporting blocks 138 and 139 is made approximately three times the vertical dimension of the tray suspension lips 86 and 87 which are slidably received in the suspension slots 140 and 141. As a consequence of the excess vertical dimension of the slots 140, 141 with respect to the lips 86 and 87 slight overtravel of the elevator 103 in the vertical Z direction is possible in the course of depositing a tray 11-1 carried by the elevator on the platen 20-1 of the selector 8-1. The existence of such Z direction overtravel reduces the criticality of positioning required of the elevator 103 as it moves in the vertical direction when depositing a tray 11-1 carried thereby on the platen 20-1.

Within the limits established by the moving magnet 24-1 and fixed locating surface 240*b*, the excessive length of the sorting and lock bars 48-1 and 50-1 in the Y direction with respect to the length of the tray 11-1, and the Z direction overtravel afforded by virtue of the amount by which the height of the slots 140, 141 exceeds the height of the lips 86 and 87, criticality in positioning a tray on the platen 20 by tray retriever 64 is reduced in the X, Y and Z directions, respectively. As a consequence, and to the extent of the X, Y and Z positioning tolerances provided by magnet 24-1 and locator 240b, excessive sort and lock bar length, and elevator overtravel in the vertical direction, the tray retriever 64 transports the tray in a "floating manner" to the platen 20-1 and is not relied upon for accurate final positioning of the tray 11-1 on the platen 20-1 of selector 8-1. Accurate and final positioning, by the tray retriever 64, of the tray 11-1 on the selector platen 20-1 is accomplished in the X direction by the moving magnet 24-1 and locator 240*b*, in the Y direction is not essential due to the excessive length of the sorting and lock bars 48-1 and 50-1, and in the Z direction is accomplished by the platen itself which seats the tray at the proper vertical position as the elevator 103 overtravels in the downward direction in the course of depositing the tray on the platen.

FIG. 22 shows an alternative pendulum mount 399 for the tower 100 (not shown in FIG. 22). The mount includes a horizontally disposed platform 400 to which is fixedly mounted the vertically disposed tower. The platform 400 on opposite sides thereof has pivotally connected to it by pins 402, 402 a pair of parallel links 403, 403, only one pair of which is shown in FIG. 22. The upper ends of links 403, 403 include slots 405, 405 which receive stationary pins 406, 406 horizontally projecting from main frame horizontal cross-member 407. Links 403, 403 also include rollers 408, 408 mounted to horizontal pins 409, 409 projecting from and fixedly secured to the exterior surface of the links. Cooperating with rollers 408, 408 are horizontal ledges 410, 410 mounted to the main frame MF by means not shown. The rollers 408, 408 at all times ride on their respective ledges 410, 410.

To drive the platform 400 between its front position (shown in solid lines in FIG. 22) and its rear position (shown in phantom lines) a drive arm 415 keyed to the horizontal shaft 416 of a stationarily mounted motor 416A is provided. At the free end of drive arm 415 a horizontally extending pin 417 is secured, which rides in a vertical slot 418 formed in a vertical guide block 419 fixed to the platform 400. In operation, as the drive arm 415 rotates clockwise (as shown in FIG. 22) from the solid line position to the phantom line position, the pin 417 rides upwardly in slot 418, driving the platform 400 rearwardly (to the right as viewed in FIG. 22.) In the course of such rearward movement under control of drive arm 415, the platform 400, in addition to moving toward the rear, also follows a curved path as the links 403, 403 simultaneously pivot about the rollers 408, 408 and translate rearwardly on ledges 410, 410. The platform 400 can be positioned from the rear position shown in phantom lines in FIG. 22 to the front position shown in solid lines by rotation of the drive shaft 415 in a counterclockwise position, to effectively reverse the motions previously described. The pendulum mount of FIG. 22 reduces the power required to drive the tower 100 (not shown in FIG. 22) between its forward and rear positions over that required to power the pendulum mount described in connection with FIGS. 10–13, by effectively lengthening the parallel links on which the platform is mounted.

To elevate the card retaining bar 96 of a retrieved tray as it is being deposited by the retriever 64 on the platen 20-1 of the selector 8-1, a stationary stop 280 secured to the main frame MF is provided. The stop 280 is positioned such that the horizontal ear 96A' extending from the upper edge of tray arm 96A will engage the stop 280 as the retrieved tray 11-1 is being lowered onto the platen 20-1 by the elevator 103, and as the tray continues to be lowered by the elevator 103, will pivot the arm 96A, effectively elevating the card retention bar 96 from the lower, card retaining position (solid lines shown in FIG. 18) to the raised, card release position (shown in phantom lines). When the elevator 103 lifts the tray 11-1 off the platen 20-1 of selector 8-1 in the course of returning the tray to its crypt, the card retention bar 96 will, under its own weight, return to the lower, card retaining position.

The selector 8-1 is properly located on the main frame MF by a pair of locating pins 260, 260 which project vertically from a main frame shelf 261 into appropriately located positioning holes formed in the bottom of the selector 8-1. Selectors 8-2 and 8-3 are similarly located on their respective supporting structures 262 and 263, and accordingly are interchangeable with selector 8-1.

For the purpose of detecting, as a consequence of a card search operation, whether a card 22*a*-1 whose address has been entered into the keyboard 10 has been selected by the selector 8-1 as a consequence of retrieval of its associated tray by the tray retriever 64 and deposit thereof upon the platen 20-3, a phototransducer 270 and associated light source 271 are provided, as shown in FIG. 1. The light source 271 is mounted to the main frame MF rightwardly of the tray 11-1 positioned in selector 8-1 and directs a beam of light 273 in a Y direction across the path of cards 22*a*-1 which have been selected from the tray 11-1 and hence partially removed from the tray by advancement of the drawer-mounted transverse magnet 24-1. The phototransducer 270 is mounted to the main frame MF in a position leftwardly of the tray 11-1 positioned in selector 8-1 in a position to receive the light beam 273 when not interrupted by a selected card 22*a*-1. If the light beam 273 emitted by the source 271 is received by the phototransducer 270 following a card selection operation by the selector 8-1, wherein the drawer-mounted magnet 24-1 has advanced to the outer position shown in FIG. 1, this is evidence of the fact that a card 22 has not been partially withdrawn from the tray 11-1 and that the card selection operation by the selector 8-1 has failed to select the desired card. Receipt of the light beam by the phototransducer 270 under such circumstances can be utilized to generate an electrical signal for appropriate control purposes, such as commanding the tray retriever 64 to return the tray 11-1 to storage in its respective crypt C.

To facilitate automatically determining if a card 22 stored in a retrieved tray 11-1 positioned in the selector 8-1 is misfiled, that is, does not belong in that tray, a second light source 275 and phototransducer 276 are provided. The light source 275 is mounted to the main frame MF rightwardly of tray 11-1 positioned in selector 8-1 in a position such that it directs a horizontal light beam in the Y direction through the aligned holes H formed in the rear section of the tray side walls 75 and 77, intermediate dividers 82 and combined divider and support walls 91. The phototransducer 276 is secured to the main frame MF to the left of the tray 11-1 positioned in selector 8-1 such that it is aligned with the holes H and adapted to receive the light beam 277 if not interrupted by the presence of a card in the tray 11-1 which has not advanced from the deck 22-1 under the action of the drawer-mounted magnet 24-1 pursuant to the card selection process.

In operation, a card stored in a tray 11-1 positioned at the selector 8-1 which is misfiled in that tray is detected by entering into the keyboard 10 only the digits corresponding to the identity of the tray, entry of further card identifying digits being omitted. As a consequence of entering only the tray identifying digits in the keyboard 10, when the addressed tray is selected from its crypt by the retriever 64 and positioned in the selector 8-1, the selector will partially withdraw from the selected tray 11-1 under the action of the advancing transverse magnet 24-1 all cards in that tray which are encoded with the tray identifying digits which were entered into the keyboard. Any card not partially withdrawn from the retrieved tray 11-1 by the magnet 24-1 as a consequence of the selection process will not have been encoded with the identifying digits of the tray located in the selector 8-1 which have been entered into the keyboard 10. The cards which have not been selected remain fully inserted in the tray 11-1 and interrupt the beam of light 277 emitted by the light source 275. As a consequence, phototransducer 276 does not receive the light beam 277. The failure of phototransducer 276 to receive the light beam 277 emitted from the source 275 can be used to generate an electrical control signal to indicate the presence of a misfiled card in the tray 11-1 positioned in the selector. This control signal can be used to operate a signal light, buzzer or the like to indicate a misfiled card, which the operator would then manually remove and insert in the re-file compartment 11-3D of tray 11-3 of selector 8-3.

At periodic intervals the cards in buffer selectors 8-2 and 8-3 can be returned to their respective trays 11 of document bank 60 by a process termed herein the "reconstitution process". In accordance with the reconstitution process the identifying digits of all trays, and only the tray identifying digits, are successively entered into the keyboard 10. For example, tray identifying code 00 is entered into the keyboard 10 whereupon tray 00 is retrieved from crypt C-00 of the bank 60 and transported to the selector 8-1. Following deposit of retrieved tray 00 in selector 8-1 all selectors 8-3, 8-2 and 8-1 go through a card selection operation to retrieve and partially withdraw all cards encoded with the tray address 00. Cards which have been partially withdrawn from the trays 11-2 and 11-3 of buffer selectors 8-2 and 8-3 are those which belong in tray 00 and, hence, are manually removed from buffer selectors 8-2 and 8-3 and inserted in tray 00 presently positioned in the selector 8-1. The tray 00 is then returned to its crypt C-00. Following this, the address digits of tray 01 are entered into the keyboard whereupon tray 01 is retrieved from crypt C-01 of the bank 60 and positioned in selector 8-1 following which all cards belonging to tray 01 are selected by the selectors 8-1, 8-2 and 8-3. Selected cards of buffer selectors 8-2 and 8-3 are then manually withdrawn and inserted in tray 01 in selector 8-1. Tray 01 is then returned to its crypt C-01 and the process repeated for the remaining trays 02, 03, . . . 59.

In accordance with the foregoing reconstitution process, all cards in buffer selectors 8-2 and 8-3 can, at predetermined intervals, such as each day or each week, be properly positioned in their respective trays 01, 02, . . . 59 of the document bank 60. In addition, as a consequence of the reconstitution process and by virtue of photodetector 275, 276, any misfiled cards can be detected as an incident to the reconstitution process. Specifically, when a tray code is entered, such as tray code 01, and tray 01 retrieved, deposited in selector 8-1 and the selection process effected to partially withdraw all cards encoded with tray designation 01, any card remaining in tray 01 positioned in selector 8-1 will interrupt light beam 277. This causes the photodetector 275, 276 to produce a signal indicating the presence of the card which has not been partially withdrawn as an incident to the card selection process, and hence, the presence of a card which is misfiled.

Having described our invention, we claim:

1. Apparatus for retrieving stored documents comprising:

a plurality of groups of documents encoded with identifying data in accordance with a predetermined code, storage means for normally storing each of said groups in storage locations, a first document selector located at a first location remote from said storage locations, said document selector operable in a selection cycle to select a document from among a group of documents thereat which are normally stored remote therefrom in said storage locations by said storage means, means for retrieving a group of stored documents and depositing said retrieved group of documents at said first selector for document selection thereby, a second document selector located at a second location remote from both said first selector and said storage locations, said second selector normally containing documents encoded with identifying data in accordance with said predetermined code, said second document selector operable in a selection cycle to select a document from said document selector operable in a selection cycle to select a document from said documents contained thereat, and control means for receiving the identity of a desired document presumedly located in a specified one of said stored groups and, in response thereto, operating said retrieving means to transport the documents in said specified group to said first selector and effecting selection cycles at said first and second selectors to select said desired document from among the documents at said selectors.

2. Apparatus for retrieving stored documents comprising:

a plurality of trays each containing stored documents encoded with identifying data in accordance with a predetermined code, a plurality of stationary storage crypts for normally storing each of said trays at different addressable storage locations, a first document selector located at a first location remote from said tray storage crypts, said document selector operable in a selection cycle to select a document from among a plurality of documents thereat normally stored in a tray remote therefrom in one of said storage crypts, a tray retriever for retrieving a tray from a selected one of said crypts and depositing said tray at said first selector for document selection thereby, a second document selector located at a second location remote from both said first selector and said tray storage crypts, said second selector normally containing documents encoded with identifying data in accordance with said predetermined code, said second document selector operable in a selection cycle to select a document from said documents contained thereat, and means for receiving the identity of a desired document presumedly located in a specified one of said stored trays and, in response thereto, operating said retrieving means to transport said one tray and documents contained therein to said first selector and effecting selection cycles at said first and second selectors to select said desired document from among the documents at said selectors.

3. A method of processing documents comprising the steps of:

encoding a plurality of groups of documents with identifying data, randomly storing said encoded document groups in individual crypts positioned at separate addressable locations, generating signals correlated to the identifying data of a desired document, transporting, in response to said signals, the group of documents in which the desired document is presumed stored from its crypt to a first document selector adapted to select the desired document from the group thereat in the course of a selection cycle, initiating selection cycles in said first selector and a second selector which is also adapted to select a desired document from among a plurality of documents encoded with identifying data which are temporarily stored thereat, transferring the desired document selected from said transported group at said first selector to temporary storage in said second selector, and returning the documents in said second selector to storage in their respective crypts with their respective groups of documents following temporary storage in said second selector for a period including multiple card selector selection cycles.

4. The method of claim 3 further including the step of subjecting desired documents selected by said first selector to a processing step externally of said selectors intermediate the steps of selection of said desired document by said first selector and return of said desired document to storage in its respective crypt.

5. The method of claim 3 wherein said returning step includes successively generating signals correlated to the identifying data of different document groups, successively transporting, in response to said successive generation of document group identifying signals, said groups of documents to said first selector, successively initiating selection cycles in said second selector to successively select from documents stored thereat documents belonging to said different groups, and successively transferring the documents selected by said second selector to their respective document groups successively transported to said first selector while said groups are at said first selector.

6. The method of claim 5 wherein said returning step further includes successively initiating selection cycles in said first selector to successively select from document groups successively transported thereto all documents properly stored in said groups, successively detecting documents unselected during said successive first selector selection cycles, and removing said unselected documents from said groups while said groups are in said first selector.

7. A method of processing documents comprising:

encoding a plurality of groups of documents with identifying data, randomly storing said encoded document groups in individual crypts positioned at separate addressable locations, successively generating signals correlated to the identifying data of a different document group, successively transporting, in response to said successive generation of document group identifying signals, said groups of documents to a first selector, successively initiating selection cycles in a second selector to successively select from documents stored thereat documents belonging in said different groups, successively transferring the documents selected by said second selector to their respective document groups successively transported to said first selector while said groups are at said first selector, successively detecting documents unselected during said successive first selector selection cycles, and removing said unselected documents from said groups while said groups are in said first selector.

8. Apparatus for retrieving stored documents comprising:

a plurality of groups of documents encoded with identifying data in accordance with a predetermined code, storage means for normally storing each of said groups in storage locations, a first document selector operable in a selection cycle to select a document from among a group of documents thereat which are normally stored remote therefrom in said storage locations by said storage means, means for retrieving a group of stored documents and operatively positioning said retrieved group of documents and said first selector for document selection thereby, a second document selector normally containing documents encoded with identifying data in accordance with said predetermined code, said second document selector operable in a selection cycle to select a document from said documents contained thereat, and control means for receiving the identity of a desired document presumedly located in a specified one of said stored groups and, in response thereto, operating said retrieving means to operatively position the documents in said specified group and said first selector and effecting selection cycles at said first and second selectors to select said desired document from among the documents at said selectors.

* * * * *